United States Patent [19]
Wise

[11] Patent Number: 5,224,635
[45] Date of Patent: Jul. 6, 1993

[54] MOBILE PHARMACEUTICAL HOPPER

[75] Inventor: Thomas W. Wise, Lansdale, Pa.

[73] Assignee: Plastech International Inc., Warminster, Pa.

[21] Appl. No.: 520,643

[22] Filed: May 8, 1990

Related U.S. Application Data

[63] Continuation-in-part of Ser. No. 381,600, Jul. 18, 1989, abandoned, which is a continuation of Ser. No. 35,972, Apr. 8, 1987, Pat. No. 4,848,605.

[51] Int. Cl.$^5$ .............................................. B65D 88/30
[52] U.S. Cl. ...................... 222/608; 222/183; 222/185; 222/460; 206/511; 206/508; 206/512; 206/599; 220/469; 220/254
[58] Field of Search ............... 222/131, 608, 183, 185, 222/462, 460, 540; 414/608; 220/469, 254, 72; 206/508, 511, 512

[56] References Cited

U.S. PATENT DOCUMENTS

| | | | |
|---|---|---|---|
| 3,083,879 | 4/1963 | Coleman | 222/185 X |
| 3,318,473 | 5/1967 | Jones et al. | 414/608 |
| 3,407,971 | 10/1968 | Oehler | 222/185 |
| 3,602,400 | 8/1971 | Cooke | 222/185 |
| 3,759,416 | 9/1973 | Constantine | 206/508 X |
| 4,245,685 | 1/1981 | Nemitz et al. | 220/72 X |
| 4,280,640 | 7/1981 | Daloisio | 222/561 |
| 4,397,406 | 8/1983 | Croley | 222/105 |
| 4,398,653 | 8/1983 | Daloisio | 222/143 X |
| 4,456,141 | 6/1984 | Pamment | 220/254 X |
| 4,475,672 | 10/1984 | Whitehead | 222/561 |
| 4,591,065 | 5/1986 | Foy | 206/512 X |

FOREIGN PATENT DOCUMENTS

| | | | |
|---|---|---|---|
| 1027128 | 3/1958 | Fed. Rep. of Germany | 220/72 |
| 1333605 | 6/1963 | France | 222/185 |

Primary Examiner—David H. Bollinger
Attorney, Agent, or Firm—John F. A. Earley; John F. A. Earley, III

[57] ABSTRACT

An integral double wall hopper for handling, storing and dispensing dry flowables such as capsules, tablets, and powders in the pharmaceutical industry, comprises an outer shell having a bottom wall and four walls extending upwardly from the bottom wall, an inner shell having a frustoconical bottom wall and four walls extending upwardly from the frustoconical bottom wall, a lip along the upper edges of the upwardly extending walls connecting the outer shell to the inner shell, four downwardly extending legs formed in the bottom wall of the outer shell forming supporting members for the hopper, a discharge opening molded in the center of the frustoconical bottom wall of the inner shell and in the bottom wall of the outer shell, and a closure member positioned on the discharge opening for opening and closing the discharge opening to dispense the contents of the hopper when desired. Runners molded in the periphery of the bottom wall of the outer shell allow the tines of a forklift truck to pick up the hopper from the side without damaging the discharge opening or the closure member. Protector bosses molded in the bottom wall of the outer shell allow the tines of a forklift truck to pick up the hopper from the front or rear without damaging the discharge opening or the closure member. The hopper has a plurality of covers including a cover which has a manway formed therein, a lid for the manway, and a plurality of towers formed on the cover for protecting the manway of a lower stacked hopper and the closure member of an upper stacked hopper from being damaged by the tines of a forklift when the hoppers are moved. One cover is hinged at one end to allow the hopper to be filled without removing the entire cover. The hopper includes a plurality of recessed channels formed in the walls of the outer shell to make the hopper easy to maneuver without injuring an operator's hands.

24 Claims, 15 Drawing Sheets

MOBILE PHARMACEUTICAL HOPPER

CROSS-REFERENCES TO RELATED APPLICATIONS

This is continuation-in-part of my U.S. patent application Ser. No. 07/381,600 filed on Jul. 8, 1989, now abandoned, which is a continuation of my U.S. patent application Ser. No. 07/035,972 filed on Apr. 8, 1987, now U.S. Pat. No. 4,848,605 issued Jul. 18, 1989.

BACKGROUND OF THE INVENTION

1. Field of the Invention

This invention relates to stackable gravity-discharge portable hoppers for handling, storing and dispensing bulk materials, and more particularly concerns hoppers in sanitationconscious or hygienic environments, for example, for use with dry flowables such as capsules and tablets in the pharmaceutical industry.

2. Description of the Prior Art

Portable or mobile hoppers of the prior art have used a separate base or stand to support stainless steel or, later, a synthetic plastic hopper. Typically, such supporting bases or stands were made of stainless steel. More recently, these supporting stands have been made of molded seamless double wall plastic construction. The separate hopper and separate support stand must be cleaned, and cleaning two pieces of equipment is more time-consuming and expensive.

Another problem with separate hopper and base combinations is that if the hopper-base combinations are stacked four or five high, when an operator of a forklift attempts to move a stacked hopper-base, he cannot see the lid or manway of the hopper below, and he has to guess how high he must raise the tines of his forklift to slip under the upper hopper-base and not damage the lid or manway of the lower hopper. The operator may misjudge the height at which to place the tines of his forklift and may damage the lid and manway of the hopper that is underneath the hopper he wishes to move.

Also, the forklift operator must judge how far apart to space the tines of his forklift truck so it does not damage the iris valve or slide gate valve that may be located on the bottom of the upper hopper. If the operator of a forklift does not space the tines of his forklift truck far enough apart, the tines may cause damage to the iris valve and may even damage the bottom wall of the upper hopper.

Another problem is that it has been difficult to gain access to the inside of portable hoppers positioned under a machine, such as a coating machine or tablet forming machine, because the only way to gain access to the interior may be through a manway formed in the center of the hopper cover which may be difficult to reach since it is under the center of the machine and may require additional conveyance apparatus.

Another problem is that it is difficult to store hydroscopic material in various known hoppers since the covers for these hoppers are not moistureproof.

Another problem with various known hoppers is that emptying them requires that the contents of the hopper be exposed to the surrounding environment, which is unacceptable in the pharmaceutical industry.

SUMMARY OF THE INVENTION

An object of this invention is to provide a mobile seamless, one-piece double wall hopper suitable for use with pharmaceutical tablets, capsules, and the like, and which may be used for storage as well a for discharging ingredients from the hopper.

Another object of this invention is to provide a seamless one-piece double wall hopper with a cover that provides for safely and securely stacking the hoppers one upon another, and provides for moving a hopper from the stacked position by a forklift operator without damaging the lid or manway of a lower stacked hopper or the bottom wall or discharge valve of an upper stacked hopper.

Another object of this invention is to provide a hopper that has easy access to its interior from the outside.

Another object of this invention is to provide a hopper which is strengthened by ribs and channels on its exterior walls.

Another object of this invention is to provide a hopper with a cover that may be sealed with tamper-evident seals.

Another object of this invention is to provide a hopper that may be placed on a dolly so the hopper may be easily moved from place to place.

Another object of this invention is to provide a hopper with hand receiving safety structure so that an operator can move from place to place without injuring his hands.

It is another object to make the best use of available floor space by providing a hopper that is self-stacking, so that a specific area of a building does not have to be dedicated for storage and storage racks.

It is also an object to provide a hopper with a low profile so that it may be used with standard pharmaceutical manufacturing equipment. A low profile reduces the risk of crushing soft tablets and capsules in the bottom of the hopper because the head loading is reduced.

It is still another object to provide a hopper having a substantially moisture-proof cover.

It is still another object to provide a hopper that may be emptied into a coating machine, for example, without exposing the contents of the hopper to the surrounding environment.

DETAILED DESCRIPTION OF THE DRAWINGS

Figure 1:
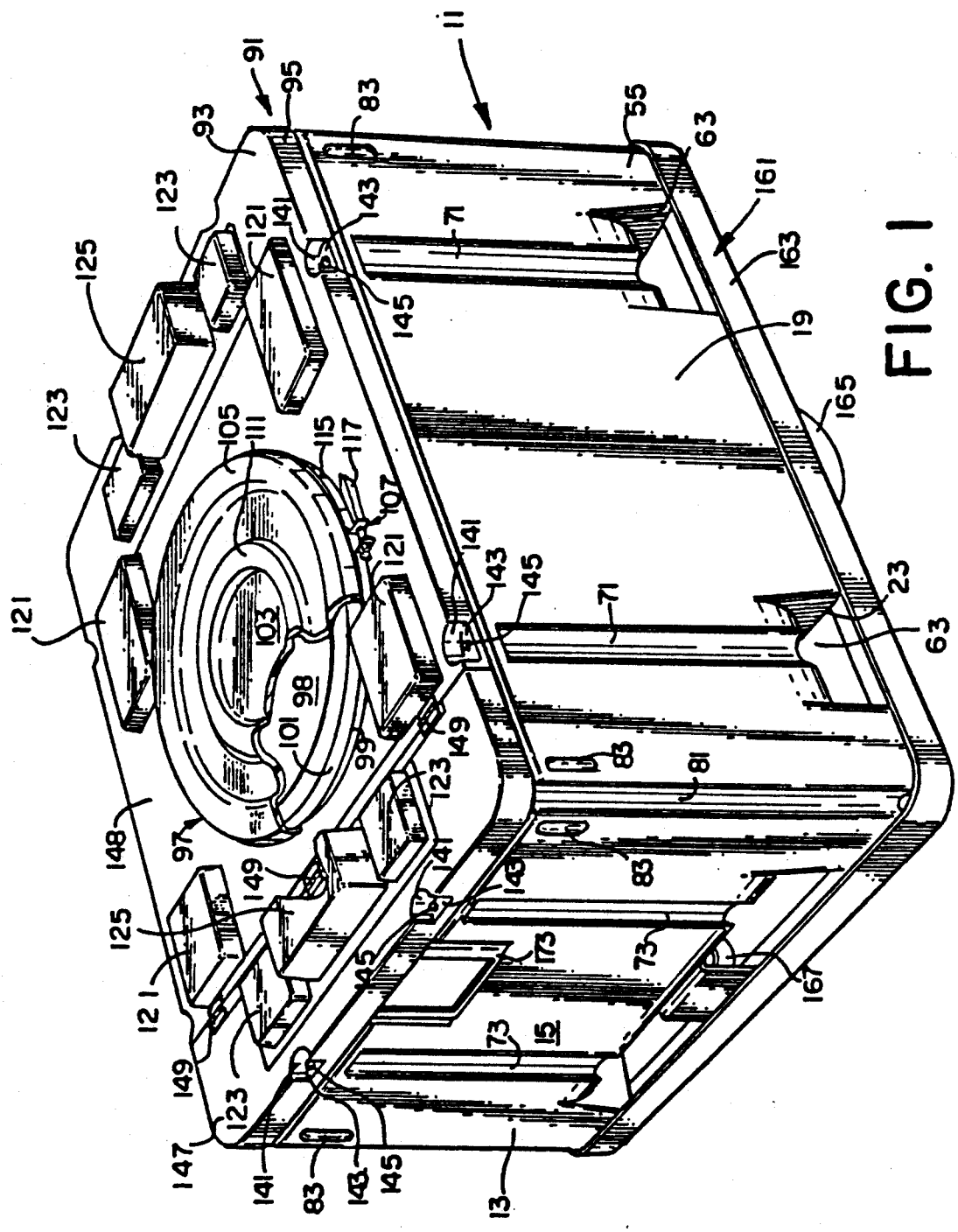
FIG. 1 is a view in perspective of the hopper and cover, with a lever locking lid attached to the cover and the hopper supported by a dolly.
Figure 2:
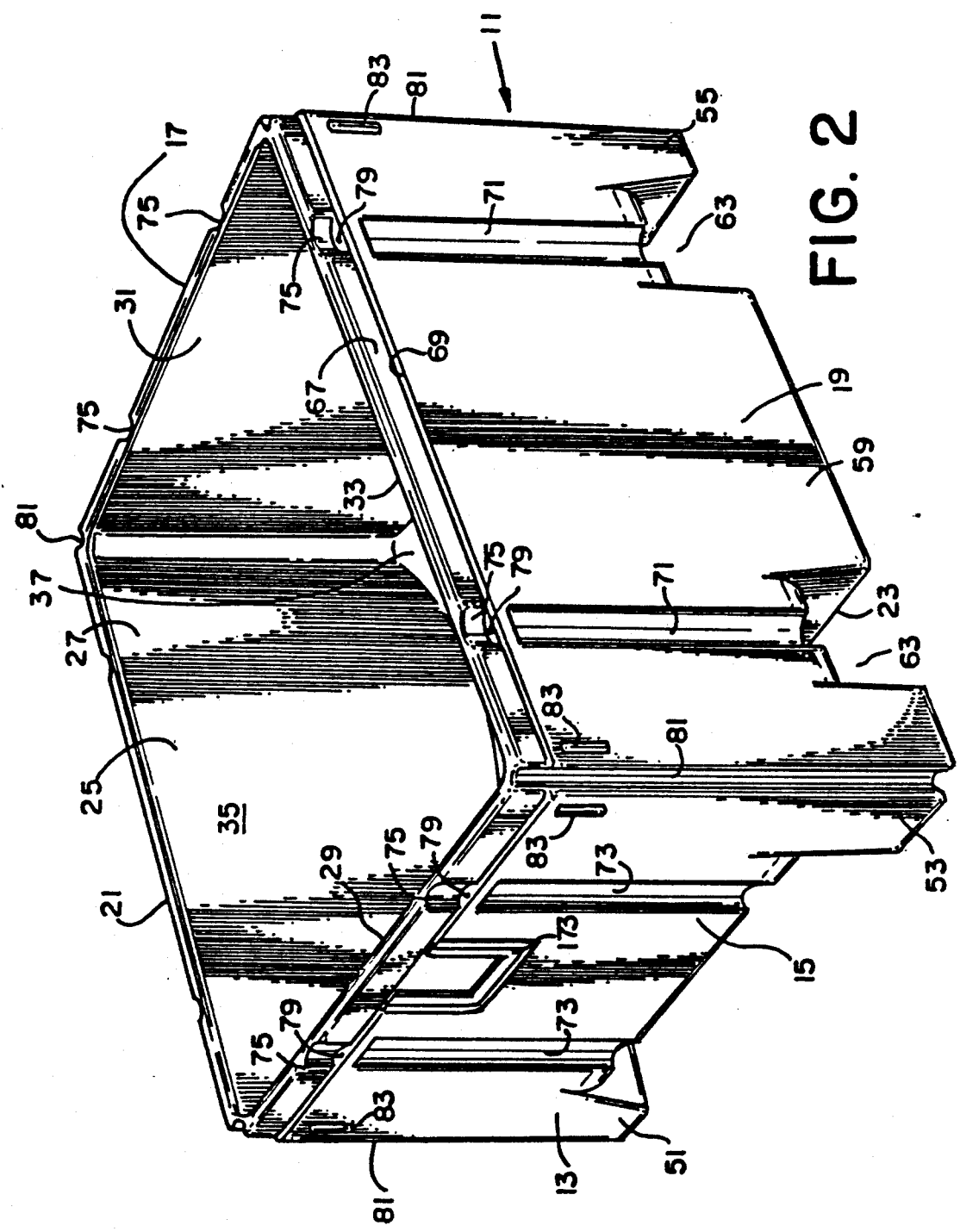
FIG. 2 is a view in perspective of the hopper with the cover removed and without a dolly.
Figure 3:
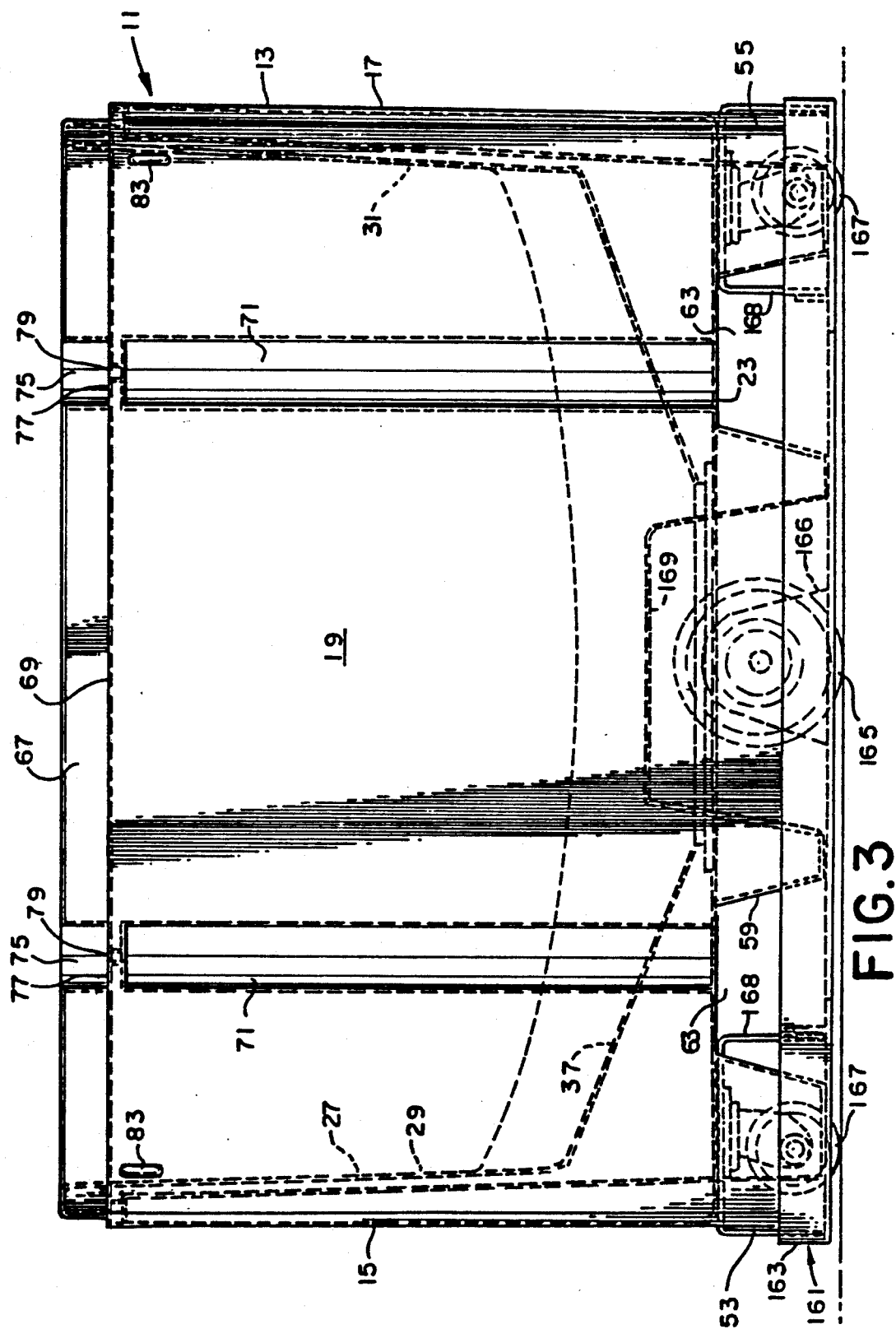
FIG. 3 is a view in side elevation of the hopper.
Figure 4:
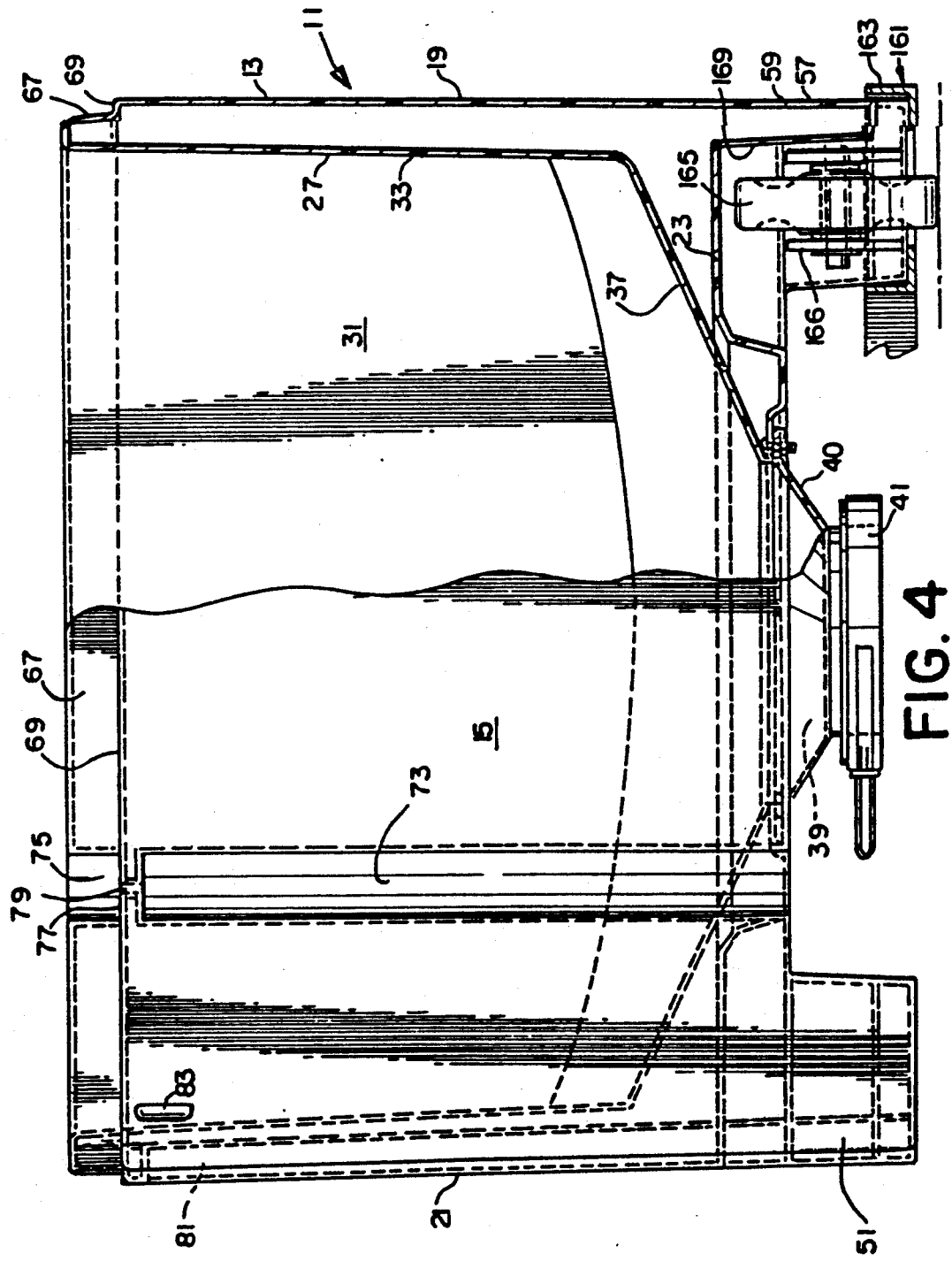
FIG. 4 is a view in front elevation of the hopper.
Figure 5:
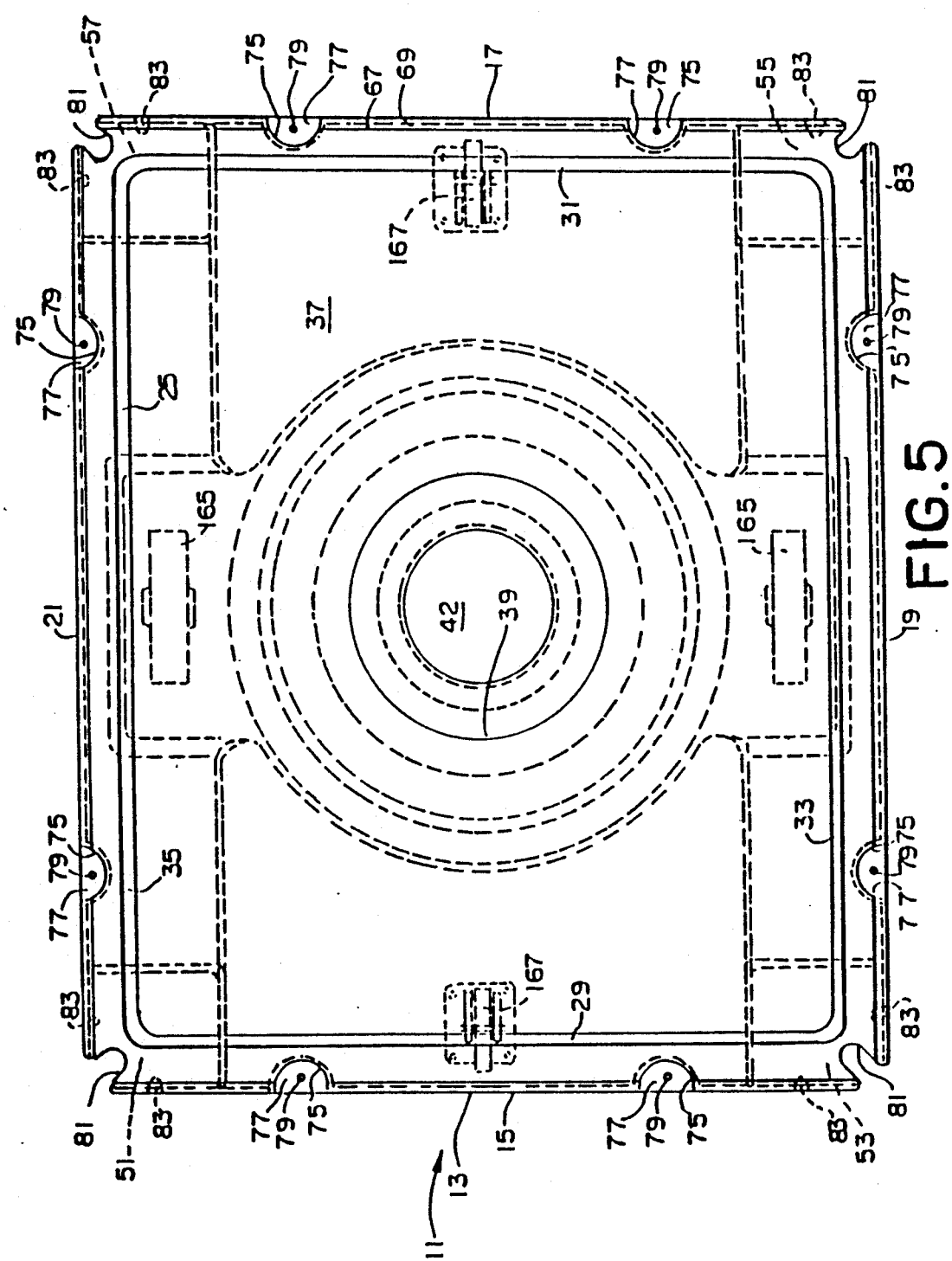
FIG. 5 is a view in top plan of the hopper with the cover removed.

Turning now to the drawings, there is shown an integral double wall hopper 11 which is formed by a rotational molding process that comprises an outer shell 13 with a cylindrical upright wall which may include a front wall 15 and a rear wall 17 connected by a pair of side walls 19, 21, and a bottom panel 23 connecting the bottoms of all the walls. The word cylindrical is used to define hopper walls which may be round, rectangular, or having many sides.

An inner shell 25 is integrally connected to outer shell 13 and also has a cylindrical upright wall which may have a rectangular upper portion 27 including a front wall 29 and rear wall 31 connected by a pair of side walls 33, 35 and a lower frustoconical portion 3 integrally joined to the bottom of the rectangular upper portion 27.

A discharge opening 39 is molded in the bottom of the frustoconical portion 37 of inner shell 25 and the bottom panel 23 of outer shell 13.

A detachable cone 40 having opening 42 is attached to bottom panel 23 of outer shell 13 near discharge opening 39. The slope, altitude, and size of opening 42 of the walls of cone 40 may be changed to vary the clearance between the bottom of cone 40 and the floor.

Detachable closure means such as iris valve 41 is mounted on cone 40 for opening and closing opening 42 to dispense the contents of the hopper 11 when desired at a controlled rate. The size of the discharge may be changed easily by simply detaching cone 40 from discharge opening 39 and attaching a cone 40 with a different size discharge opening 42, and with a different size iris valve 41. Valve 41 may have six inch, eight inch, or ten inch diameter outlets to accommodate the mass, particle size and funnel flow characterisitics of the products in the hopper. For example, you may wish to increase the outlet diameter to prevent the bridging of a powder.

Outer shell bottom panel 23 includes downwardly extending legs 51, 53, 55, 57, one in each corner, which form support members for the hopper 11.

The outer shell bottom panel 23 further includes a pair of parallel spaced apart runners 59. One runner 59 is formed at the base of side wall 19 and is spaced away from legs 53 and 55 to form two openings or channels 63. Similarly, the other runner 59 is formed at the base of outer shell side wall 21 and is spaced away from legs 51 and 57 to form two openings or channels 63. Openings 63 are wide enough to admit the tines of a forklift truck or pallet jack when it is desired to lift or move the hopper 11. Further, runners 59 are placed to block the tines and protect the cone 40 and valve 41 from being struck by the tines and damaged. The openings 63 guide the tines away from the cone 40 and valve 41.

Hopper 11 is integral and is one-piece and is made of a synthetic plastic, preferably polyethylene, by a rotational molding process.

A top portion of outer shell front wall 15, rear wall 17 and side walls 19, 21 is recessed inwardly to form cover engaging upright rim 67 and ledge 69.

A pair of ribs 71 are formed in outer shell side walls 19, 21 and a pair of ribs 73 are formed in outer shell front wall 15 and rear wall 17. The ribs 71, 73 are semicircular in shape and are recessed into the outer shell 13. Ribs 71 extend from the top of side wall openings 63 to a point below ledge 69, and ribs 73 extend from the bottom of outer shell front wall 15 and rear wall 17 to a point below ledge 69.

Upper ribs 75 are formed in cover engaging rim 67 of outer shell 13 at positions that correspond to side wall ribs 71 and front and rear wall ribs 73, forming shoulders 77 in the outer shell 13 at points between side wall ribs 71 and ribs 75, and front and rear wall ribs 73 and ribs 75. Shoulders 77 have openings 79 formed therein to allow passage of a bolt or wire of a tamper evident seal.

Handle means are also provided for moving or pushing the hopper when desired without exposing the fingers or thumbs of an operator's hands to injury, and the handle means comprises upright channels 81 formed in each corner of outer shell 13 and extending for the entire vertical height thereof, and thumb slots 83 formed in outer shell 13 at a point below ledge 69 and near channels 81 so that an operator can insert his fingers in channels 81 and his thumb in thumb hole 83. Channels 81 also form a column to provide additional strength for the outer shell 13 to support hoppers 11 when they are stacked one upon another.

A main cover 91 adaptable to fit hopper 11 is provided, and it includes flat surface or portion 93 and lip or skirt portion 95.

Flat portion 93 has a circular manway 97 formed therein, which is defined by opening 98, neck 99 and rim 101. Manway rim 101 extends vertically above the plane of flat portion 93, and is formed at the top of manway neck 99. Manway rim 101 also extends outwardly from manway neck 99 so that a lever locking apparatus 103 may be secured to manway 97.

Lever locking lid apparatus 103 comprises a synthetic plastic lid 105, and a separate lever locking apparatus or ring 107. Lid 105 includes a lid rim which fits over manway rim 101, and a center portion 111 with a raised circumferential ridge formed therein, which adds to the strength and rigidity of lid 105 but does not exceed the height of lid rim.

Lever locking ring 107 is made of metal, and includes a channel portion 115 with the channel legs positioned above the top of the lid rim and below the bottom of manway rim 101 when lid 105 is placed upon manway 97. When the lever locking apparatus channel portion 115 is so positioned, lever lock 117 may be closed to secure lid 105 to manway 97. Lever locking apparatus 107 is adaptable to include a tamper evident seal.

Figure 6:
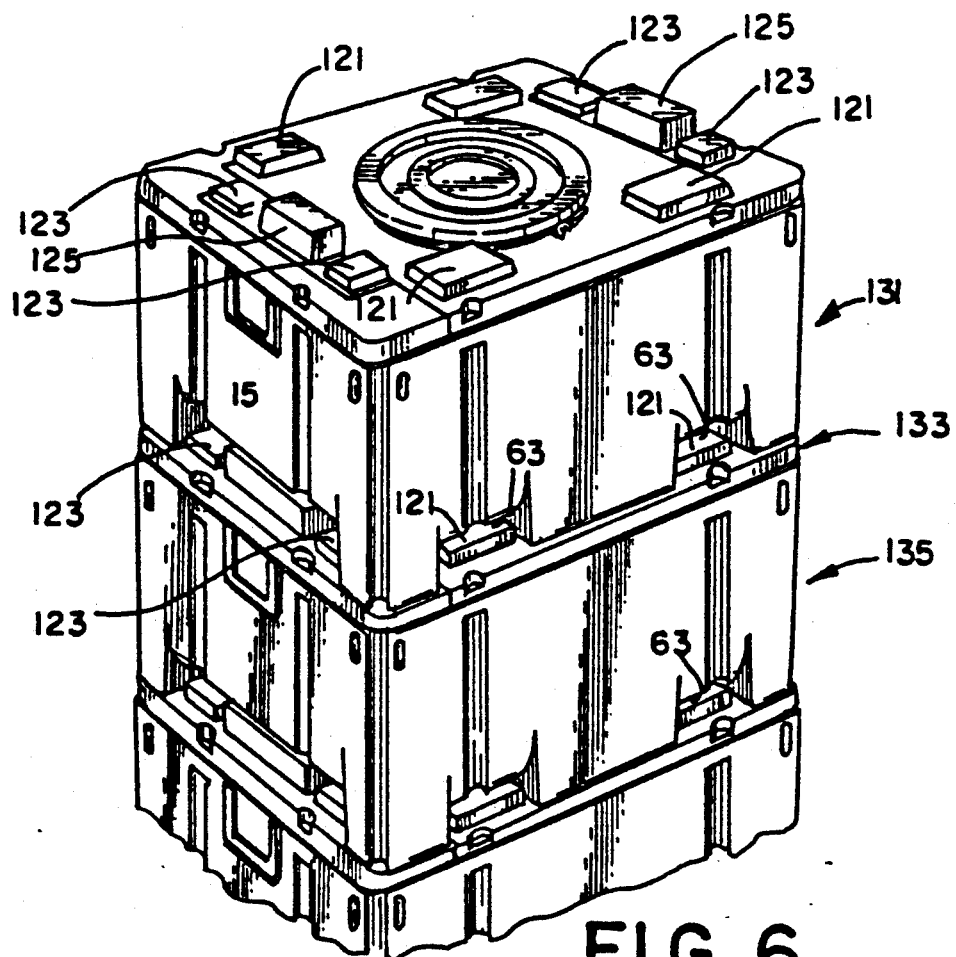
FIG. 6 is a view in perspective of hoppers stacked one upon another.

Cover 91 is provided with side towers 121 and end towers 123 which rise vertically above flat portion 93 for a distance slightly greater than the vertical distance from the cover flat portion 93 to the top of lever-locking lid 103. The tops of side towers 121 and end towers 123 are coplanar, and are positioned around the perimeter of flat portion 93 so that when another hopper 11 is stacked on cover 91, side towers 121 are positioned in openings 63 between legs 53, 55 and runner 59, and between legs 51, 57 and runner 59, and abut, or nearly abut, legs 51, 53, 55, 57 and runners 59. End towers 123 are positioned on cover 91 so that when another hopper 11 is stacked on cover 91, end towers 123 abut, or nearly abut, legs 51, 53 at the base of outer shell front wall 15, and abut legs 55, 57 at the base of outer shell rear wall 17. Referring to FIG. 6, it may be seen that when an upper hopper 131 is stacked on cover 133 of lower hopper 135, side towers 121 and end towers 123 of cover 133 prevent lateral movement of upper hopper 131.

Further, side towers 121 and end towers 123 of cover 91 serve the additional function of preventing the tines of a forklift from damaging the manway 97 or lever locking lid apparatus 103 when moving a hopper 11 from one place to another. Referring again to FIG. 6, it may be seen that if an operator desired to move upper hopper 131 from its stacked position on top of lower hopper 135, the operator would have to raise the tines of his forklift to a point above the side towers 121 and end towers 123 in order to insert the intes beneath hopper 131 but above towers 121, 123 of hopper 135. Because towers 121, 123 are higher than lever locking lid apparatus 103, when lever locking lid apparatus 103 is secured to manway 97, the manway 97 and lever locking lid apparatus 103 are not damaged by the tines of a forklift when upper hopper 131 is moved.

Cover 91 further includes a pair of spacing towers 125 formed on flat portion 93 and positioned at opposite ends of cover 91 near the front wall 15 and rear wall 17 of outer shell 13 and between end towers 123. Spacing towers 125 are high enough above flat portion 93 so that when a hopper 11 is stacked on cover 91, the spacing towers 125 nearly abut the bottom of outer shell front wall 15 and outer shell rear wall 17 of the upper hopper 11. Spacing towers 125 are wide enough so that when the tines of a forklift are inserted underneath outer shell front wall 15 or outer shell rear wall 17 the tines do not strike and damage discharge cone 40 or iris valve 41. Referring again to FIG. 6, it may be seen that if a forklift operator desires to remove upper hopper 131 from its stacked position on top of cover 133 of lower hopper 135, he may insert the tines of the forklift from the outer shell front wall 15 side or outer shell rear wall 17 side but must space the tines of his forklift sufficiently far apart to slide by both sides of spacing towers 125.

In the perimeter of cover 91, cover ribs 141 and cover rib shoulders 143 are formed and positioned to correspond to top ribs 75 and shoulders 77 of outer shell 13 of hopper 11. When cover 91 is placed on hopper 11, lip portion 95 of cover 91 securely engages rim 67 until the bottom of cover lip 95 abuts ledge 69 of hopper 11. Further, cover ribs 141 and cover rib shoulders 143 fit into and slidably engage top ribs 75 and shoulders 77 of hopper 11, thus insuring a snug fit of cover 91 on hopper 11. Ledges 143 of cover 91 include openings 145 formed therein, so that a tamper evident seal may be placed through cover rib ledge opening 145 and ledge opening 79 of outer shell 13 to allow detection of a break of the seal and unauthorized entry into hopper 11.

Cover 91 is preferably formed in two separate parts, as shown in the drawings, a hinged portion 147 and a main portion 148. Hinged portion 147 is connected to main portion 148 by hinges 149. Hinged portion 147 preferably includes two end towers 123 and a spacing tower 125.

Figure 7:
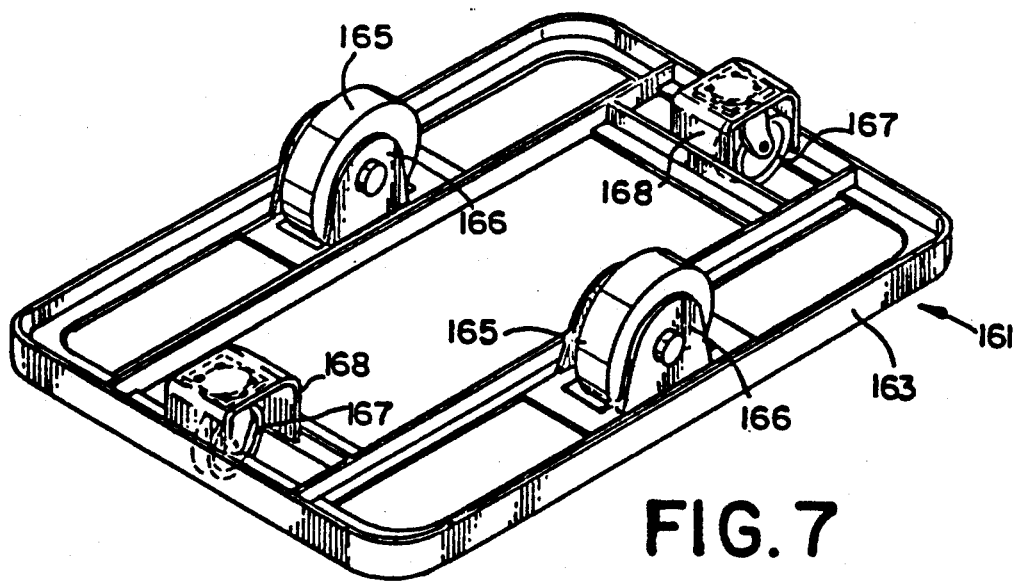
FIG. 7 is a view in perspective of a dolly adapted for use with the hopper.

Hopper 11 is also adaptable to be used with a dolly 161. As shown in FIG. 7, dolly 161 comprises a frame 163 made of angle iron, a pair of wheels 165 mounted on wheel supports 166 that are attached to opposite sides of frame 163, and a pair of casters 167 mounted on caster supports 168 at the front and rear end of dolly frame 163. The wheels 165 and casters 167 are positioned in this pattern, commonly known as a diamond pattern, to allow dolly 161 to rotate about a point. Outer shell wheel wells 169, 171 are formed in the bottom of runners 59 to allow free movement of wheels 165 when the hopper 11 is moved from place to place on dolly 161. Legs 51, 53, 55, 57 of hopper 11 fit snugly into dolly frame 163, and the bottom of outer shell front wall 15 and rear wall 17 abuts the top of dolly caster supports 168.

Instead of lever locking lid apparatus 103, cover 91 may be provided with a dust cover that fits securely over rim 101 of manway 97, but is not locked thereon. Also, the cover 91 may itself be replaced by a dust cover which protects the contents of the hopper but does not provide for stacking.

Front wall 15 of outer shell 13 may include a molded cardholder 173 to allow the insertion of a card identifying the contents of hopper 11.

In operation, hopper 11 is placed on dolly 161. Cover 91 is placed on top of hopper 11 and pressed down so that lip portion 95 of cover 91 slidably contacts cover engaging rim 67 and comes to rest upon ledge 69 of hopper 11. Manway 97 is open, and hopper 11 is filled with dry flowables such as capsules or tablets through manway 97. If hopper 11 has been filled through manway 97, lid 105 is placed on manway 97 and slidably engages rim 101. Lid 105 is secured to manway rim 101 by placing lever locking apparatus 107 around lid 105 and manway rim 101 and closing lever lock 117.

An operator may push the filled hopper 11 from place to place by inserting his fingers in channels 81 and his thumbs in thumb slots 83 and pushing the hopper 11 and dolly 161 from place to place.

Hopper 11 may be emptied by positioning cone opening 42 of hopper 11 over the container in which the contents of hopper 11 are to be emptied, and opening iris valve 41.

Stacked hoppers 131, 135, as shown in FIG. 6, may be moved from the stacked position by inserting forklift tines above side towers 121 of lower stacked hopper 135 and through openings 63. Also, an operator may move a stacked hopper 131 from stacked hopper position on top of hopper 135 by inserting his forklift tines above end towers 123 and on both sides of spacing towers 125 of cover 91 of the lower stacked bin 135, and lifting the upper hopper 131 by elevating the tines.

Turning now to FIGS. 8-12, there is shown an integral double-wall hopper 211 for handling, storing and dispensing dry flowables, such as capsules, tablets and powders in the pharmaceutical industry, which comprises an outer shell 213, an inner shell 215 integrally molded to outer shell 213, a discharge opening 217 molded in the center of bottom wall 219 of the inner shell 215 and in bottom wall 221 of the outer shell 213, and a slide gate valve 223 positioned at the discharge opening 217 for opening and closing the discharge opening 217 to dispense the contents of hopper 211 when desired.

Hopper 211 is integral and is one-piece and is made of a synthetic plastic, preferably polyethylene, by a rotational molding process.

Outer shell 213 has four walls 225, 227, 229 and 231 extending upwardly from bottom wall 221.

A pair of ribs 233 are formed in outer shell walls 225 and 229, and a pair of ribs 235 are formed in outer shell walls 227 and 231. Further, a center rib 237 is formed in each of walls 227 and 231. Ribs 233, 235, 237 are semicircular in shape and are recessed into the outer shell 213 and are provided to strengthen outer shell 213 and to prevent outer shell walls 225, 227, 229, 231 from bending.

Outer shell 213 is also provided with channels 239 formed in each corner of outer shell 213. An operator wishing to move or push hopper 211 may insert his fingers in channel 239 to guard against injury to his fingers while pushing hopper 211. Channel 239 also provides additional column strength for the outer shell 213 for supporting one or more additional hoppers 211 when they are stacked one upon another.

The bottom wall 221 of outer shell 213 has downwardly extending legs 243, 245, 247, 249 molded therein, one in each corner, which form support members for the hopper 211.

The outer shell bottom wall 221 also has a pair of spaced-apart runners 251, 253. Runner 251 is formed at the base of upwardly extending wall 227 of outer shell 213 and is spaced away from legs 243 and 245 to form two openings or channels 255. Similarly, runner 253 is formed at the base of upwardly extending wall 231 of outer shell 213 and is spaced away from legs 243 and 249 to form two openings or channels 257. Openings 255, 257 are wide enough to admit the tines of a forklift truck or pallet jack when it is desired to lift or move the hopper 211. Further, runners 251, 253 are positioned to block the tines and protect the slide gate valve 223 from being struck by the tines and damaged. Openings 255, 257 guide the tines away from the slide gate valve 223.

Inner shell 215 has four walls 259, 261, 263 and 265 extending upwardly from its frustoconical bottom wall 219. However, bottom wall 219 may be formed in other shapes, such as pyramidal.

Figure 10:
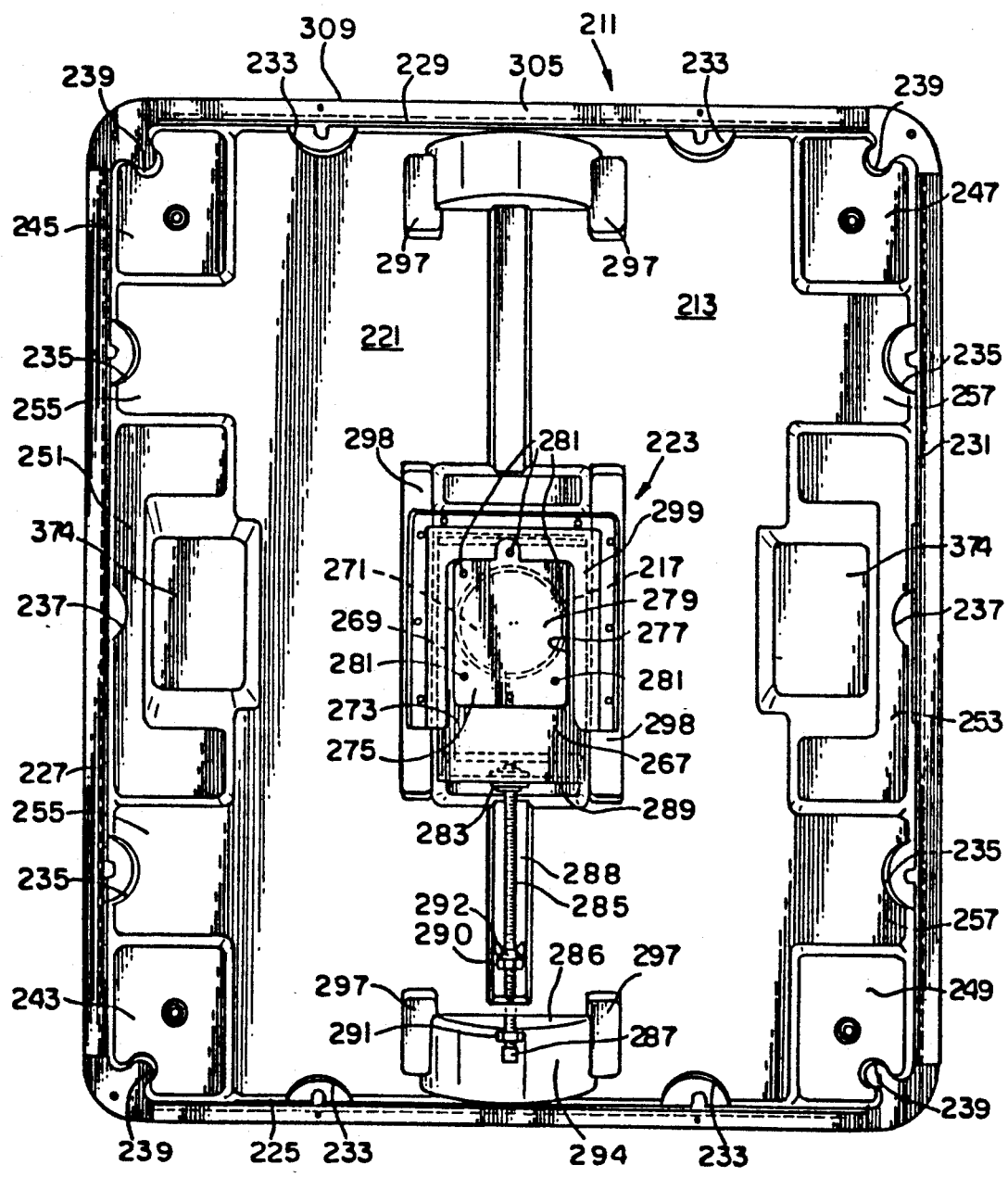
FIG. 10 is a view in bottom plan of the hopper of FIG. 8.
Figure 11:
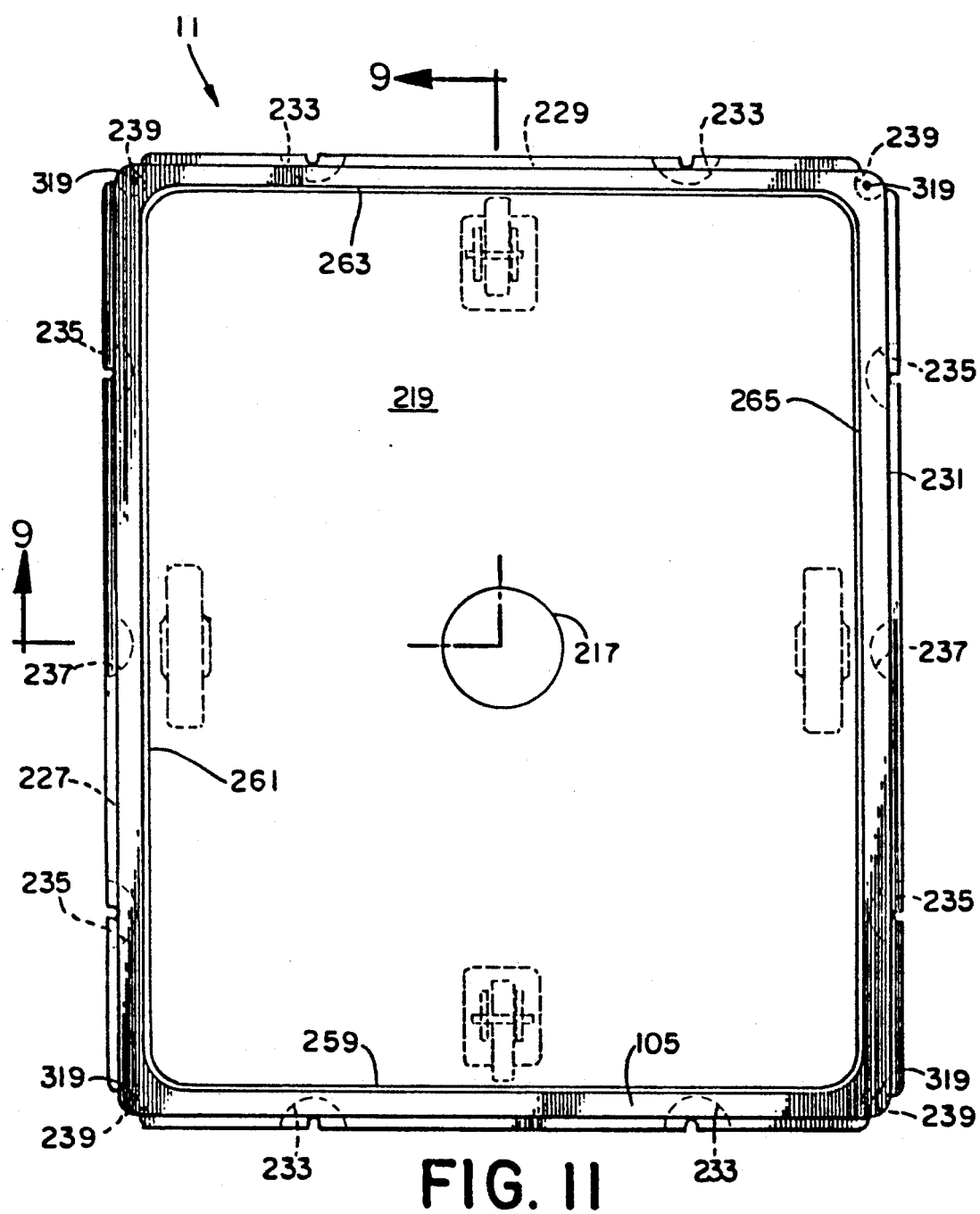
FIG. 11 is a view in top plan of the hopper of FIG. 8 taken along lines and arrows 11—11 of FIG. 8.

Referring to FIG. 10, slide gate valve 223 is positioned on discharge opening 217 for opening and closing the discharge opening 217 to dispense the contents of hopper 211 when desired.

Figure 12:
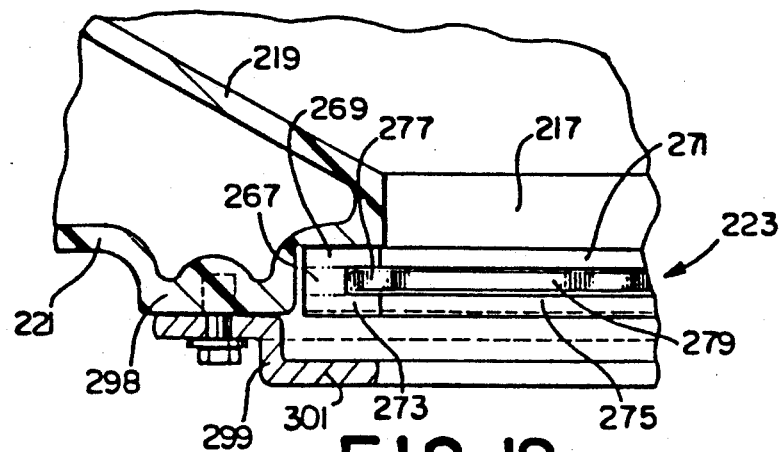
FIG. 12 is an enlarged cross sectional view taken along the circle and line marked "see FIG. 12" of FIG. 9.

Slide gate valve 223 has a frame 267 mounted on the bottom wall 221 of outer shell 213 and surrounding discharge opening 217. Frame 267 has a first rectangularly-shaped panel 269 having a circular opening 271 formed therein that corresponds to discharge opening 217, and a second panel 273 having a rectangular opening 275 that is aligned with discharge opening 217 and opening 271 of first panel 269. Panels 269 and 273 are connected together at their outer edges, but are spaced apart. As shown in FIG. 12, a channel or groove 277 is formed between first panel 269 and second panel 273 of frame 267 in which a slide gate 279 is slidably mounted. Frame 267 is mounted on bottom wall 221 of outer shell 213 by screws 281, as shown in FIG. 10, which are screwed into threaded inserts that are integrally molded into bottom wall 221.

Slide gate 279 is provided with a mounting block 283 at one of its end portions, and a pull bar or threaded rod 285 is connected to mounting block 283 by screwing threaded rod 285 into a threaded cavity in mounting block 283, and threaded rod 285 is slidably mounted on bottom wall 221 of outer shell 213 by extending through a cylindrically molded tube 296a molded in a projection 286 formed in bottom wall 221 of outer shell 213. A handle 287 is formed on the other end portion of threaded rod 285 to facilitate pulling threaded rod 285 to open slide gate valve 223. A channel 288 is formed in bottom wall 221 of outer shell 213, and threaded rod 285 is positioned in channel 288 to protect threaded rod 285 from being struck and damaged by the tines of a forklift truck. Likewise, channel 289 is formed next to channel 288 to receive and to protect mounting block 283 from contact with the tines of a forklift truck.

A first nut 290 is screwed onto threaded rod 285. A second nut 291 also is screwed onto threaded rod 285. As threaded rod 285 is pulled outwardly to open slide gate valve 223, first nut 290 eventually abuts against projection 286 in bottom wall 221 of outer shell 213, which acts as a stop to prevent further outward movement of threaded rod 285. Similarly, second nut 291 eventually abuts projection 286 as threaded rod 285 is pushed inwardly to close slide gate valve 223, thereby preventing further inward movement of threaded rod 285. Since first nut 290 and second nut 291 may be adjustably positioned on threaded rod 285 by turning them on threaded rod 285, an infinite adjustment may be made to the size of the opening in slide gate valve 223; that is, the size of the opening may be varied from fully opened to partially opened to fully closed.

To facilitate cleaning of slide gate valve 223, first nut 290 and second nut 291 may be removed, that is, unscrewed from threaded rod 285, to facilitate the removal of slide gate 279 from frame 267.

A wing or jam nut 292 is provided on threaded rod 285 which is positioned into contact against nut 290 after nut 290 has been positioned on threaded rod 285 to act as a stop to prevent nut 290 from unwinding from its desired position.

Figure 8:
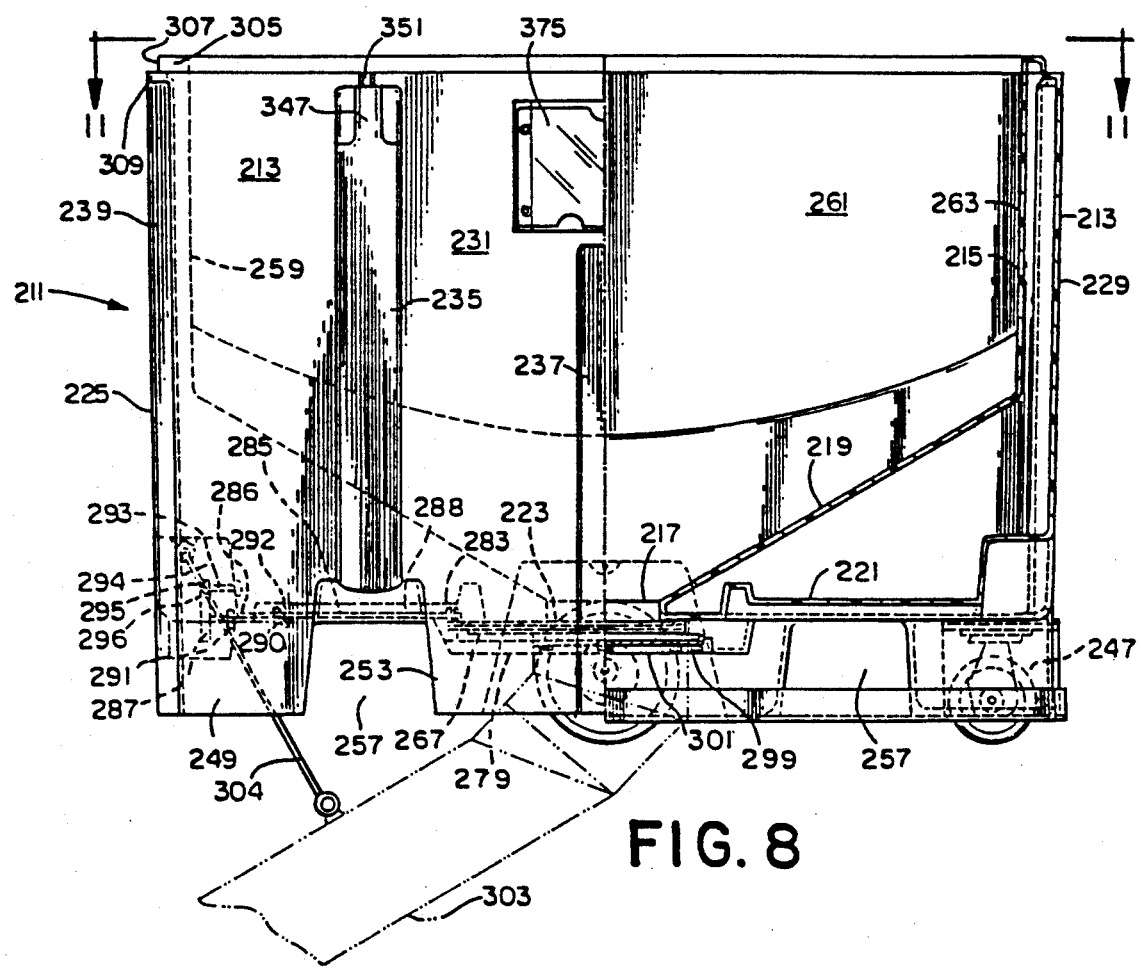
FIG. 8 is a view in side elevation of an alternative embodiment of the inventive hopper, with the hopper supported by a dolly.

Turning to FIG. 8, a thumb screw 293 is screwed into a insert molded into bottom wall 221 of outer shell 213 above handle 287 in well 294, and an opening 295 is provided in the head of thumb screw 293. Handle 287 is adapted to slide over the head of thumb screw 293 when slide gate valve 223 is in a closed position. An opening 296 also is provided in handle 287 which is aligned with opening 295 in thumb screw 293 when handle 287 is slid over thumb screw 293. A tamper-evident seal, such as a wire, may be placed through openings 295 and 296 so that an unauthorized opening of slide gate valve 223 may be easily detected. Thumb screw 293 and handle 287, when the slide gate valve 223 is closed, do not project from well 294 beyond walls 225, thereby protecting thumb screw 293 and handle 287 from being damaged by a door jamb, for example, as hopper 211 is being moved.

As shown in FIG. 10, pairs of raised protector bosses 297 are formed in the bottom wall 221 of outer shell 213 near the bases of upwardly extending walls 225 and 229. Further, raised protector bosses 298 are formed in bottom wall 221 of outer shell 213 next to slide gate valve 223. Raised protector bosses 297 and 298, which project downwardly from bottom wall 221 farther than slide gate valve 223 does, protect slide gate valve 223 from being struck and damaged by the tines of a forklift truck. Raised protector bosses 297 and 298 block and prevent the tines of a forklift truck form striking slide gate valve 22 if the forklift truck driver misjudges where the tines are when inserting the tines under hopper 211 from either the front or rear.

Figure 9:
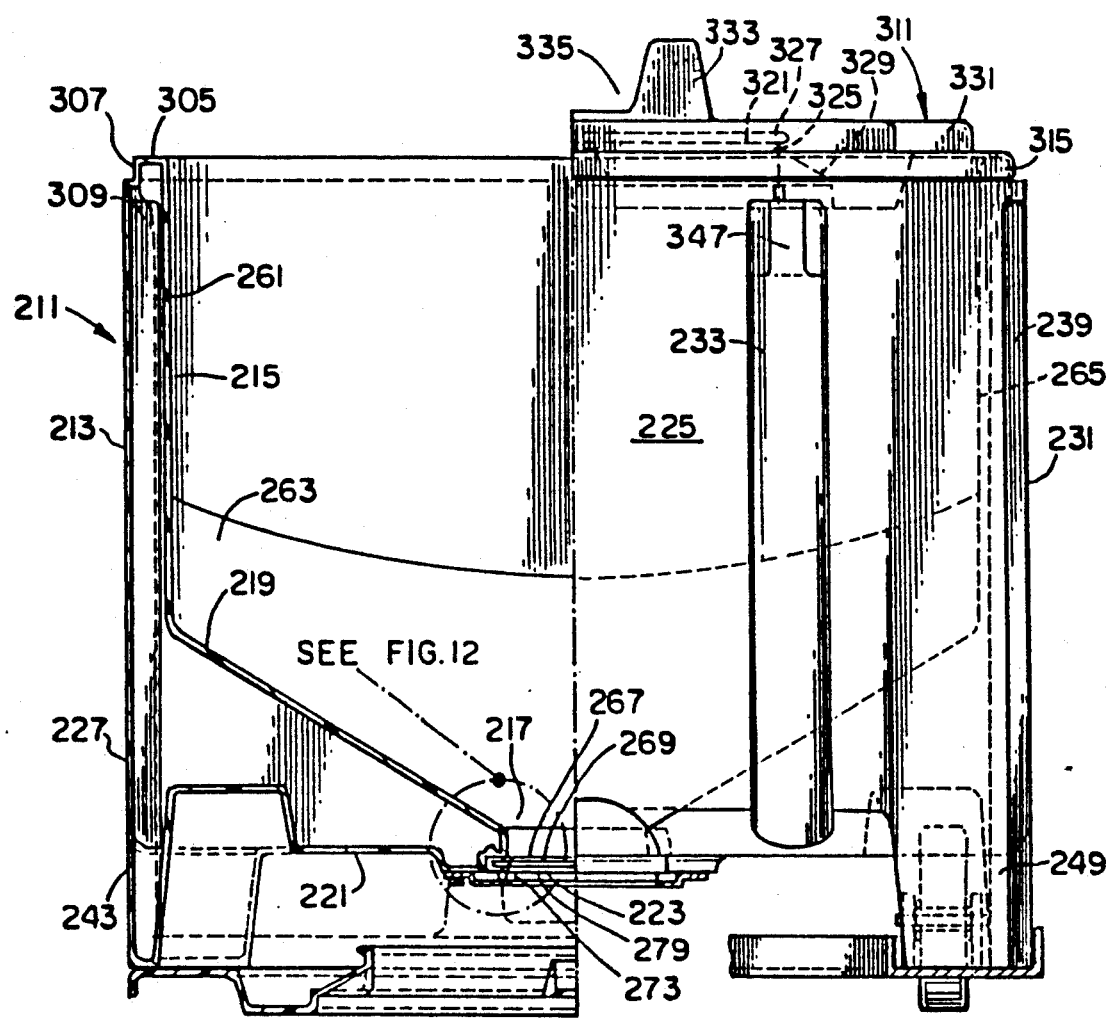
FIG. 9 is a view in front elevation of the hopper of FIG. 8 with the right side of drawing showing the dolly supporting the hopper, and with the left side of the drawing showing in a cutaway sectional view the bottom portion of the hopper, and with the left side of the drawing showing the bottom portion of the hopper engaging a cover of a lower stacked hopper.

Referring to FIGS. 8, 9 and 10, and more particularly to FIG. 12, a discharge chute retainer or Z-clip 299 is also mounted on bottom wall 221 of outer shell 213, and discharge chute retainer 299 surrounds three sides of discharge opening 217. Discharge chute retainer 299 has a annular flange 301 that accepts and holds the peripheral end portion of a cylindrical discharge chute 303. The discharge chute 303, which is preferably made of a plastic material, after it has been attached at one end to discharge chute retainer 299, may be used to direct the contents of an elevated hopper 211 from hopper 211 to another location such as a coating machine for coating pharmaceutical tablets. Accordingly, the contents of the hopper 211 may be moved from the hopper 211 via discharge chute 303 into a coating machine without being exposed to the surrounding environment.

Referring to FIG. 8, a tether 304 is optionally provided to facilitate handling of discharge chute 303, one end of tether 304 being attached to the bottom wall 221 of outer shell 213 and the other end being attached to discharge chute 303.

A lip 305 runs along the upper edges of the upwardly extending walls 225, 227, 229, 231, 259, 261, 263, and 265 connecting the outer shell 213 to the inner shell 215. The outer portion of lip 305 is rabbetted inwardly to form a cover engaging upright rim 307 and a ledge 309.

Figure 13:
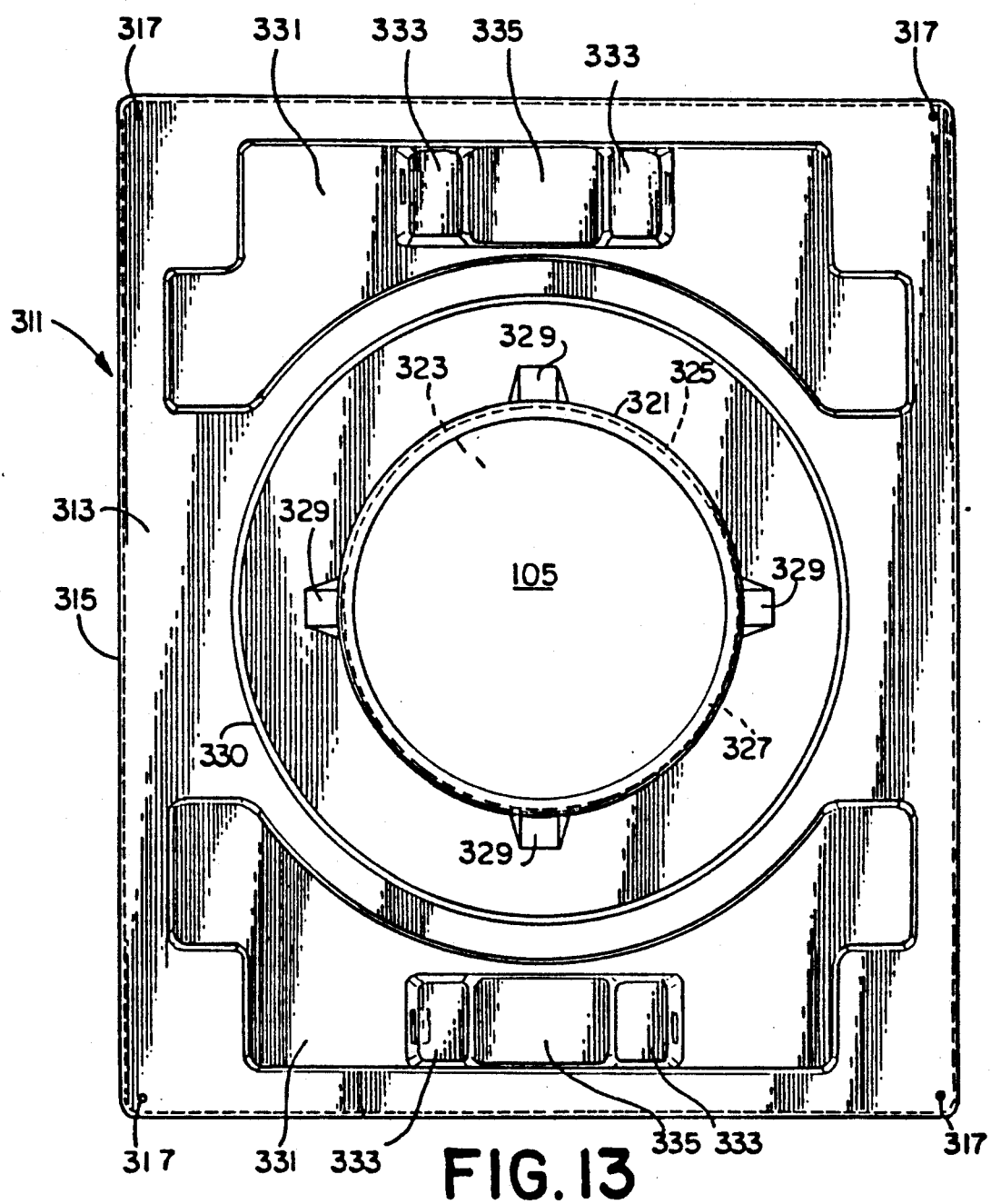
FIG. 13 is a view in top plan of a first cover for the hopper of FIG. 8.

Referring to FIGS. 13 and 9, a cover 311 is provided to cover hopper 211, and cover 311 includes a flat surface or portion 313 and a skirt portion 315 adapted to engage rim 307 of lip 305 of hopper 211.

Cover 311 is provided with an opening 317 in each of its corners, and each opening 317 is aligned with an opening 319 in lip ledge 309 in each corner of hopper 211. A tamper evident seal, such as a wire, may be placed through openings 317 and 319. Such a seal allows you to detect when the seal is broken and when there has been unauthorized entry into hopper 211.

The underside of each opening 319 in ledge is counterbored so that if it is desired to lock cover 311 onto hopper 211 with nuts and bolts, the nuts may be set in the counterbored portion of openings 319 so as not to come into contact with and cut an operator's hand while the operator pushes hopper 211.

Cover 311 has a circular manway 321 formed in flat portion 313, which is defined by opening 323, neck 325, and rim 327. Manway rim 327 extends vertically above the plane of flat portion 313, and is formed at the top of manway neck 325. Neck 325 and rim 327 are reinforced by gussets 329 formed in cover 311. Lever locking lid apparatus 103, which includes lid 105 and lever locking ring 107, is used to cover manway opening 323. A circular rib 330 is formed in cover 311 surrounding manway 321 to reinforce cover 311.

Cover 311 has a pair of towers 331 formed in its flat portion 313 that extend vertically upward from the flat portion 313 for a distance at least as high as the vertical projection of lid 105 above flat portion 313. Towers 331 are positioned so that, when another hopper 211 is stacked on the cover 311, the downwardly extending legs and runners of the upper hopper 211 rest on the flat portion 313 of cover 311, and the towers 331 abut the legs and runners of the stacked hopper to prevent lateral movement of the stacked hopper on cover 311.

Further, towers 331 serve the additional function of preventing the tines of a forklift truck from damaging the manway 321 when moving a stacked hopper 211 from atop another hopper 211. If an operator desires to move an upper hopper 211 from its stacked position on top of a lower hopper 211, the operator raises the tines of his forklift truck to a point above the towers 331 in order to insert the tines beneath the upper stacked hopper 211 but above towers 331 of the lower hopper 211. Because towers 331 are higher than manway 321 and lid 105, the manway 321 and the lid 105 are protected from damage by the tines of a forklift truck.

The underside portion of cover 311 corresponding to tower 331 is a large flat pocket, which is easy to clean.

Figure 19:
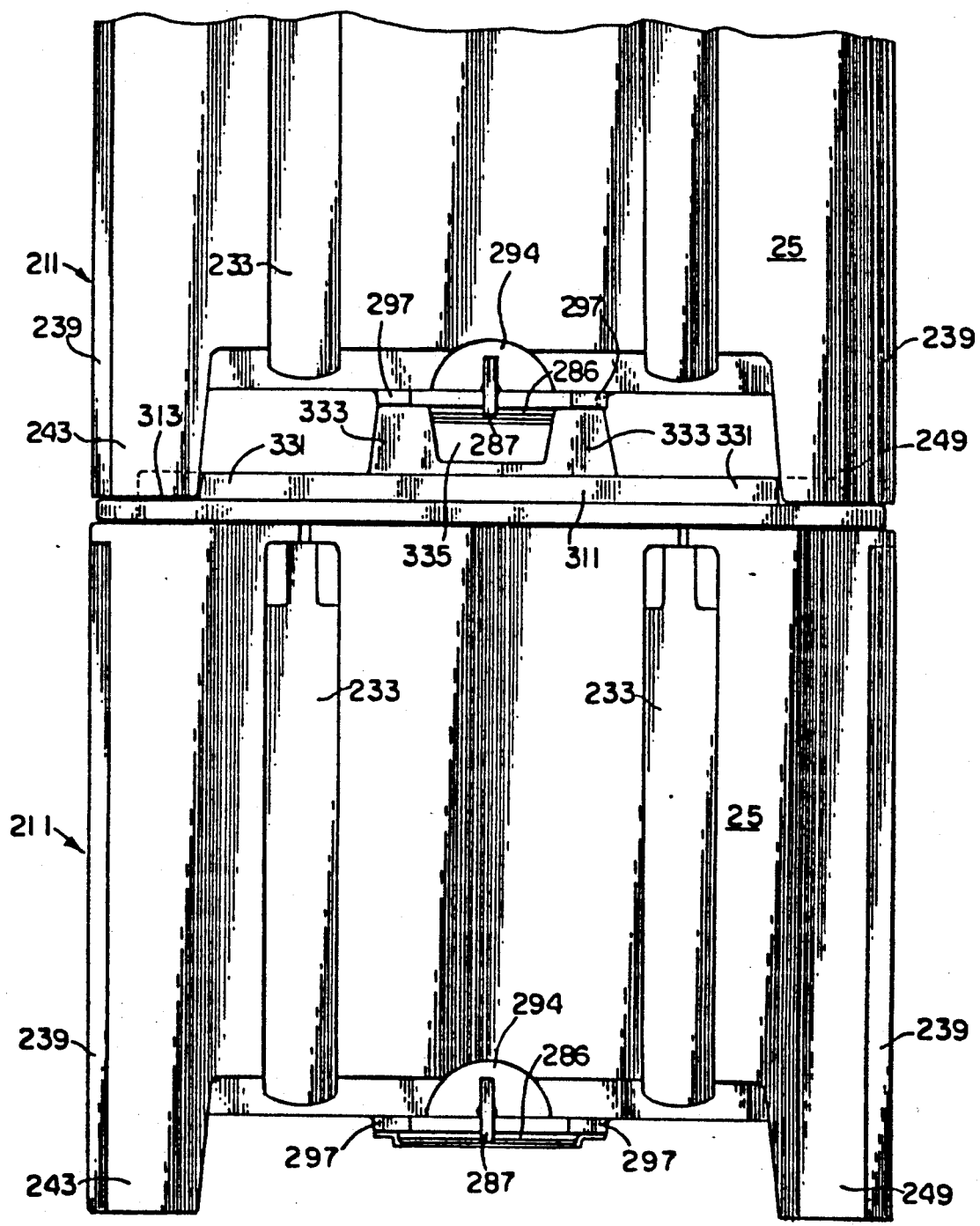
FIG. 19 is a view in front elevation of hoppers of FIG. 8 stacked one upon another.

Cover 311 also has a pair of spacing towers 333 formed at opposite ends of cover 311 near walls 225 and 229 of outer shell 213 As shown in FIG. 19, spacing towers 333 are high enough above flat portion 313 to prevent the tines of a forklift truck from being inserted into any vertical space between the top of the spacing towers 33 and the raised protector bosses 297 formed in bottom wall 221 of an upper stacked hopper 211.

Each pair of spaced towers 333 have a combined width sufficiently wide enough so that the tines of a forklift truck must be spaced apart a distance such that the tines cannot accidentally damage the slide gate valve 223 of an upper stacked hopper 211.

As shown in FIGS. 19 and 9, an opening 335 is provided between each pair of towers 333 to permit an operator when working with stacked hoppers 211 to reach in and open the lid 105 covering lower hopper 211 or to reach in and open the slide gate valve 223 of the upper stacked hopper 211.

If desired, cover 311 may be permanently attached to hopper 211 by welding cover skirt 315 to lip rim 307.

Figure 14:
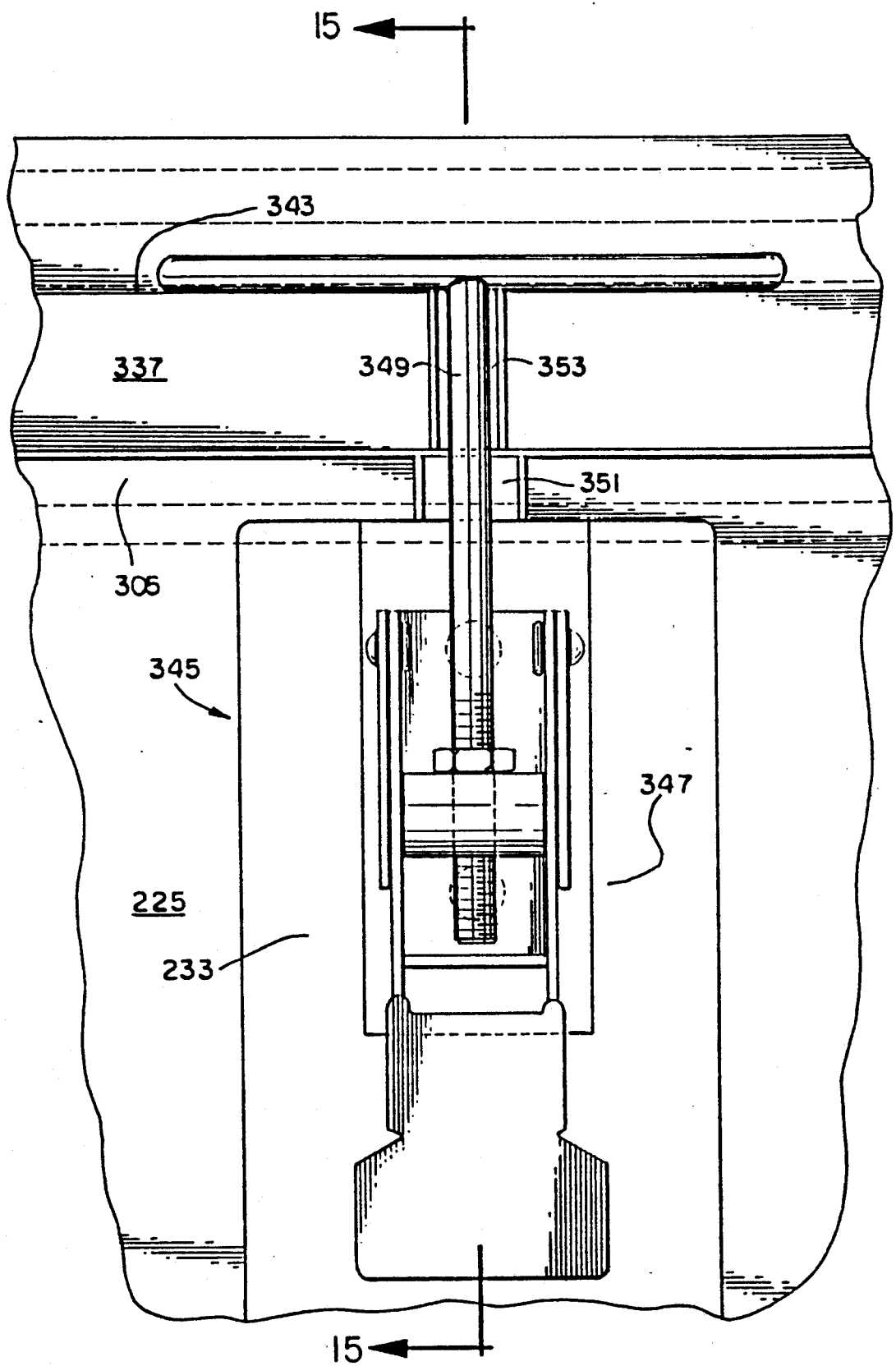
FIG. 14 is a view in front elevation of a draw latch apparatus engaging another cover for the hopper.
Figure 15:
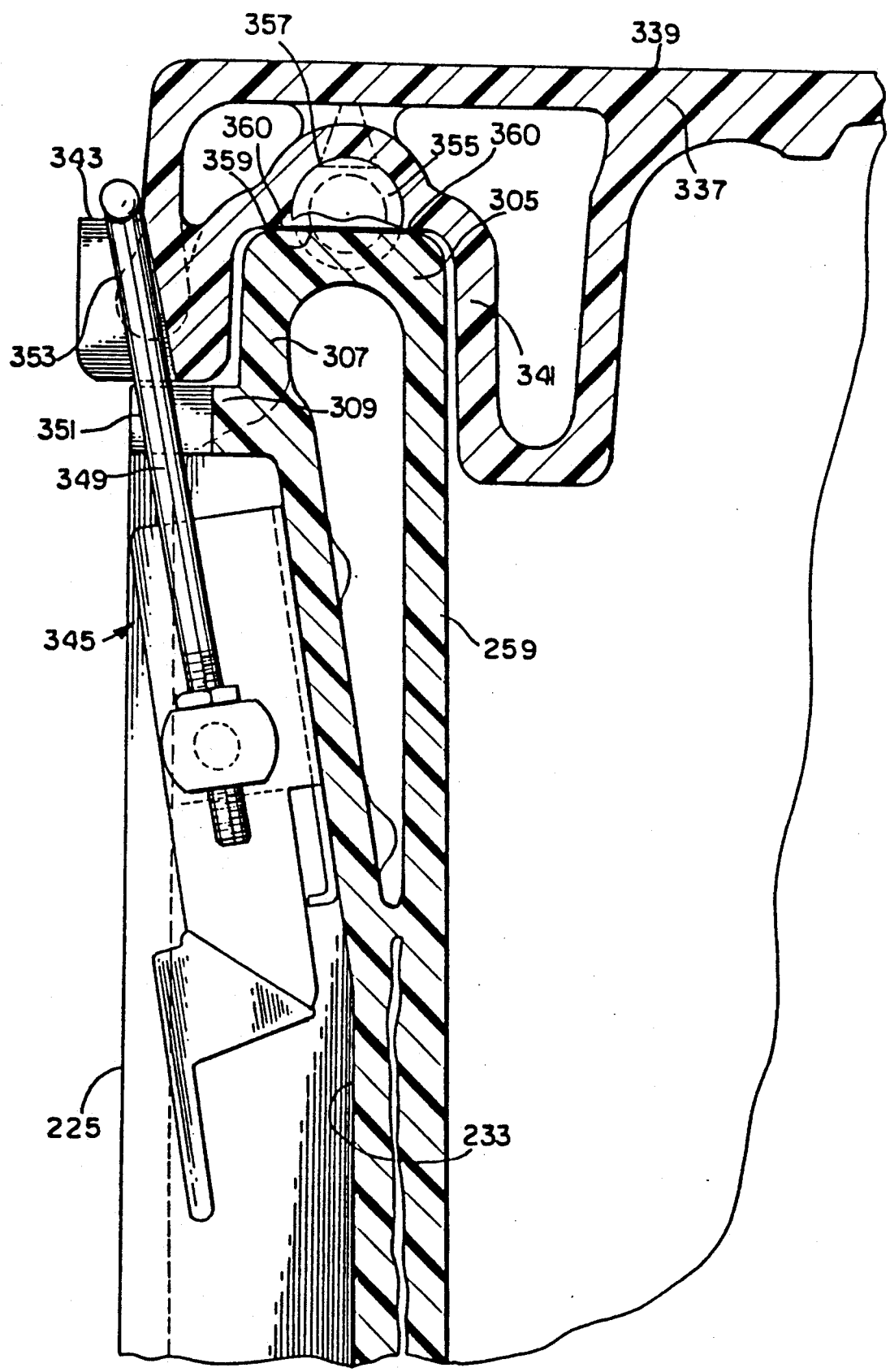
FIG. 15 is a view in cross section taken along the lines and arrows 14—14 of FIG. 14.

As illustrated in FIG. 14 and 15, a double wall cover 337 also is provided to cover hopper 211. Cover 337 has a top wall 339, which is substantially identical to cover 311, that is molded to a bottom wall 341. Unlike cover 311, the outer peripheral portion of cover 337 is recessed inwardly to form a ledge 343.

An adjustable draw latch apparatus 345, such as that made by Southco, is mounted in each rib 233 and 235 just below ledge 309 of lip 305 on flattened portions 347. Draw latch apparatuses 345 are only shown in FIGS. 14 and 15 of the drawings. Adjustable draw latch apparatus 345 includes a rod 349 that is adapted to extend through a notch 351 extending through lip ledge 309 and slot 353 of cover 337.

Referring to FIG. 15, a gasket 355, which sits in a channel 357 formed in the bottom periphery of cover 337, is provided to come into sealing contact with the flat portion 359 of lip 305. Bottom wall 341 is provided with a flat surface 360 on each side of channel 357 which contacts flat portion 359 of lip 305 to bear the load placed on cover 337 when an upper hopper 211 is stacked upon it.

Figure 16:
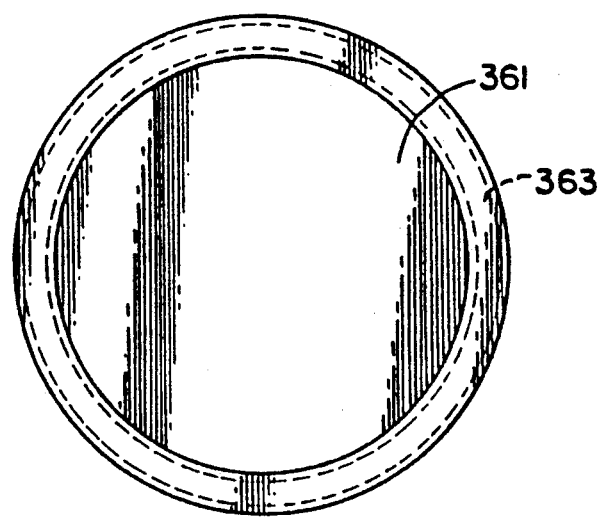
FIG. 16 is a view in top plan of a lid for covering the manway in the cover shown in FIG. 14.

A lid 361, which is shown in FIG. 16 and which is provided with a gasket 363, is provided to cover the manway in cover 337. The manway in covers 311 and 337 are constructed in the same way with a neck and a rim around the manway opening. Lid 361, which is attachable to the manway rim of cover 337 using lever locking lid apparatus 107, provides a substantially moisture-proof seal.

Lid 361 and cover 337, with its gasket 355, in conjunction with draw latch apparatuses 345, provide a substantially moisture-proof, substantially airtight seal so that the contents of hopper 211, such as pharmaceutical tablets, remain dry.

Alternatively, cover 337 may be provided without a manway formed therein; that is, such a cover has no manway opening formed in it.

Cover 311 also may be replaced by a dust cover which protects the contents of hopper 211 but an upper hopper cannot be stacked on the dust cover of a lower hopper because the dust cover cannot support the load. One such dust cover has no manway opening.

Figure 17:
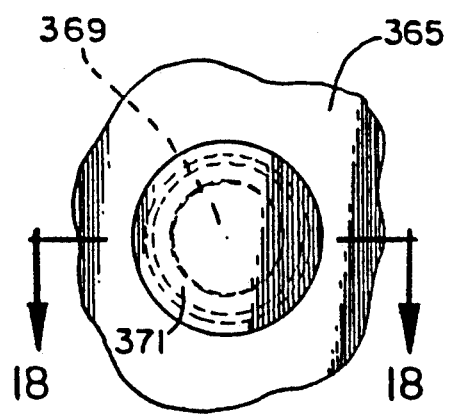
FIG. 17 is a partial view in top plan of another cover for the hopper.
Figure 18:
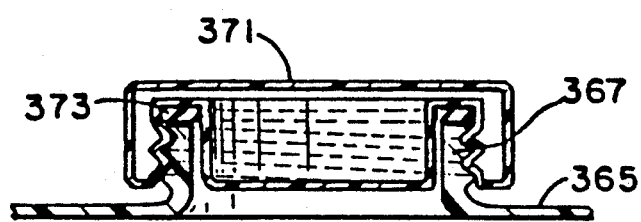
FIG. 18 is a view in cross-section taken along the lines and arrows 18—18 in FIG. 17.

Referring to FIGS. 17 and 18, another cover 365 is shown in partial view for covering hopper 211. Cover 365 is substantially the same in construction as cover 311, except that instead of a manway 321, a threaded stem 367 is formed in cover 365 to provide an opening 369 that is closed by a threaded cap 371. Cap 371 is provided with a gasket 373 to seal opening 369 when cap 371 is screwed onto stem 367.

Hopper 211 is also adapted to be used with a dolly 161 (FIG. 7). Outer shell wheel wells 374 (FIG. 10) are formed in the bottom runners 251, 253 to allow free movement of wheels 165 when hopper 211 is moved from place to place on dolly 161. Legs 243, 245, 247, 249 of hopper 211 fit snugly into dolly frame 163, and the bottoms of outer shell wall 225 and wall 229 abut the top of dolly caster supports 168. Caster supports 168 also protect slide gate valve 223 from being struck and damaged by the tines of a forklift truck by blocking access to slide gate valve 223.

As shown in FIG. 8, a molded cardholder 375 may be formed in upright wall 225 of outer shell 213 to allow the insertion of a card identifying the contents of hopper 211.

In operation, hopper 211 may be placed on dolly 161. Cover 311 may then be placed on top of hopper 211 and pressed down so that the skirt portion 315 of cover 311 slidably contacts cover engaging rim 307 of hopper lip 305 and comes to rest on lip ledge 309 of hopper 211.

Hopper 211 may now be filled with dry flowables such as capsules or tablets via opened manway 321. After hopper 211 is filled, lid 105 may be placed on manway 321.

An operator may push the filled hopper 211 from place to place using dolly 161. Hopper 211 may be emptied by positioning slide gate valve 223 of hopper 211 over the container into which the contents of hopper 211 are to be emptied, and opening slide gate valve 223.

Discharge chute 303 may be mounted on discharge chute retainer 299 beneath slide gate valve 223 to facilitate the emptying of an elevated hopper 211 and to insure that the contents of hopper 211 are not exposed to the surrounding environment by inserting the free end of discharge chute 303 into the container or machine into which the contents of hopper 211 are being emptied.

A plurality of hoppers 211 may be stacked one upon another.

Further, stacked hoppers 211 may be unstacked by inserting forklift tines above towers 331 of the cover 311 of the lowered stacked hopper 211 and through openings 255 and 257. Also, an operator may move a stacked hopper 211 by inserting his forklift tines above towers pairs 331 and on both sides of spacing towers 333 of cover 311 of the lower hopper 211 and lifting the first stacked hopper 211 by elevating the tines of the forklift truck.

When it is desired to store hydroscopic material, cover 337, together with lid 361, may be used to cover hopper 211. Cover 337 may be placed on top of hopper 211 and pressed down so that the skirt portion of cover 337 comes to rest on lip ledge 309 of hopper 211. As this occurs, gasket 355 is compressed between channel 357 in the bottom of cover 337 and the flat portion 359 of lip 305. Cover 337 may then be fastened to hopper 211 using draw latch apparatuses 345.

After hopper 211 is filled, lid 361 may be placed on the manway of cover 337.

Alternatively, cover 365 may be placed on hopper 211, and hopper 211 may be filled via opening 369. After hopper 211 is filled, cap 371 may be screwed onto stem 367 to close hopper 211.

ADVANTAGES

The new integral double wall hopper 11, 211 is actually an integral hopper and base combination. Although especially adapted for pharmaceutical use, it may be used in other fields for the storage and transmission of granular materials, as in the food industry and the chemical industry.

In the hopper 11, 211 of the present invention, the double-wall construction provides and interior shell which a frustoconical converging hopper wall section which is adapted to direct flowable materials to the discharge opening, and the exterior shell creates the framing and stacking structure of the hopper. The hopper 11, 211 is shown as being rectangular in horizontal cross-section, but it may be square or circular, if desired.

The detachable cone 40 at opening 39 provides flexibility for varying the size and diameter of the valve 41, and also for varying the height between the valve and the floor line. Also, a different type of valve, such as a slide-gate valve, could be installed instead of the iris valve 41 which is commonly used in the pharmaceutical industry to vary the flow of the ingredients being discharged from the hopper.

Slide gate valve 223 provides flexibility for varying the amount and rate of flow. Further, slide gate valve 223 is positioned so as to avoid incurring accidental damage from the tines of a forklift truck The cover 91, 311, 337, 365 is removable. This is important when the hopper 11, 211 is positioned under a tablet coating machine which discharges the coated tablets from a rotating pan that sprays them widely. If the cover 91, 311, 337, 365 were not removed, many of the coated tablets would bounce off the main cover 91, 311, 337, 365 and would bounce all over the floor.

The manway 98, 315 is molded into the top of cover 91, 311, 337, 365 to provide for quick inspection of the product in the hopper 11, 211 without requiring the removal of main cover 91, 311, 337, 365.

Hinged cover portion 148 also provides for a quick inspection of the product without withdrawing the hopper 11, 211 completely from under a machine from which it is receiving the product.

Hopper 11, 211 provides for four-way forklift entry, and two-way pallet jack entry because the space between pallet jack tines may not be varied.

Hoppers 11, 211 are particularly adapted for use in the preparation of pharmaceutical products. Hoppers 11, 211 may be used to transport, store, and discharge various intermediate products and the final products. For example, a hopper 11, 211 may receive a product from a blending machine, store the product, discharge the product into a granulating machine, discharge the granulated product into a compression machine which compresses the granulated product into a compressed tablet. A hopper 11, 211 may then directly receive the compressed tablets from the tabletting machine, store the tablets, and transport and discharge the tablets into a coating machine and be elevated by a forklift truck for direct discharge into the coating pans. Coated tablets ma be discharged directly into a hopper 11, 211, with its main cover 91, 311, 337, 365 removed. This is advantageous over the conventional method of discharging the coated tablets into a pan, and then pouring the tablets from the pan into a 55 gallon drum. The coated tablets and hopper 11, 211 may then be transported to other manufacturing areas for imprinting, storage, or packaging.

Further, hopper 211 is made substantially air-tight and substantially moisture-proof by latching cover 337 onto it and attaching lid 361 to cover 337, and this is important when storing hydroscopic products such as various types of pharmaceutical tablets.

The contents of hopper 211 may be closed off from the surrounding environment by sealing them in hopper 211, and when it is time to empty the contents of hopper 211 into a coating machine, for example, the free end of discharge chute 303 may be inserted into the coating machine and the contents of hopper 211 may be emptied directly into the coating machine via discharge chute 303 without exposing the contents of hopper 211 to the surrounding environment.

The hopper 11, 211 includes a low profile which enables it to be used with most tabletting machines, and a fully removable cover which offers a wide opening for use in receiving tablets from bottom or front discharge coating pans. Hopper 11 includes a hinged foldback cover portion 147 which is adapted for filling hopper 11 without completely removing the main cover, in some situations.

Hopper 11, 211 may be transported to various production areas by forklift truck, pallet jack, or by a stainless steel dolly 161.

Hopper 11, 211 is molded from FDA approved resin, with no liner required, has a working capacity of 20 cubic feet, and has provisions for tamper-evident seals, It is also provided with an integral card holder for positive product identification, and a completely removable cover for easy cleaning, and for use with bottom discharge coating pans.

A lid 105, 361 provides easy access for sampling of the contents. Hopper 11, 211 includes a molded-in pallet base, so that no separate pallet is required.

Hoppers 11, 211 may be securely stacked four-high when full, or six-high when empty for optimal use of warehouse space.

The one-piece, double wall structure of hopper 11, 211 has advantages. It is less expensive to manufacture than to make a separate hopper with a separate base, because the integral hopper and base of hopper 11, 211 is made in one molding operation instead of in two. Also, the one-piece hopper 11, 211 is easier to clean than a separate hopper and a separate base.

Many pharmaceutical products are sensitive to light, so it is conventional to use stainless steel as the material for containers for pharmaceutical products, because stainless steel is opaque. However, single wall containers made of synthetic plastic may not be opaque, depending upon the amount of color contained in the plastic. However, the double wall of hopper 11, 211 supplies opacity and protects the contents of hopper 11, 211 from any damage which may be caused by light.

Also, the double wall of hopper 11, 211 is very much stronger than a hopper having a single wall, and this is important, for example, for strength in stacking.

The channels 81, 239 in the corners of hopper 11, 211 provide a stacking column that is stronger than a simple corner. The weight of an upper hopper is borne on the corners of the lower hopper, and the channels 81, 239 strengthen those corners. The channels 81, 239 also provide a hand safety grip.

In the protection of pharmaceutical forms, the pharmaceutical manufacturer may use a number of hoppers 11, 211 instead of using an assortment of drums, hoppers, and pans which may require manhandling by the operator.

I claim:

1. An integral double wall hopper for handling, storing and dispensing dry flowables such as capsules, tablets, and powders in the pharmaceutical industry, comprising
   an outer shell having a bottom wall and four opposed upright outer walls extending upwardly from the bottom wall,
   an inner shell having a frustoconical bottom wall and four inner walls extending upwardly from the frustoconical bottom wall,
   a lip rim along the upper edges of the upwardly extending walls connecting the outer shell to the inner shell,
   said outer and inner shells being integrally molded together to form the double wall hopper,
   four downwardly extending legs formed in the bottom wall of the outer shell forming supporting members for the hopper,
   a discharge opening molded in the center of the frustoconical bottom wall of the inner shell and in the bottom wall of the outer shell, and
   closure means positioned on the discharge opening for opening and closing the discharge opening to dispense the contents of the hopper when desired,
   a pair of spaced-apart runners extending downwardly from opposed upright walls and forming spaces which allow entrance of the tines of a forklift truck to pick up the hopper,
   said runners having a protecting portion between said spaces and extending lower than said discharge opening and closure means with a width substantially equal to or greater than the diameter of the discharge opening and the closure means and positioned in front of the discharge opening and the closure means for blocking and protecting the discharge opening and the closure means from the tines of a forklift truck as they pick up the hopper.

2. An integral double wall hopper for handling, storing and dispensing dry flowables such as capsules, tablets, and powders in the pharmaceutical industry, comprising
   an outer shell having a bottom wall and four walls extending upwardly from the bottom wall,
   an inner shell having a bottom wall and four walls extending upwardly from the wall,
   a lip along the upper edges of the upwardly extending walls connecting the outer shell to the inner shell,
   said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, said lip having an outer portion that is recessed inwardly to form a cover-engaging upright rim and ledge, further including a rib formed in the outer shell and abutting against the underside of the ledge of the lip, the ledge having an opening formed therein extending from the top of the ledge to the rib.

3. The hopper of claim 2, further including a cardholder mounted on an upright wall of the outer shell for holding a card that identifies the contents of the hopper.

4. An integral double wall hopper for handling, storing and dispensing dry flowables such as capsules, tablets, and powders in the pharmaceutical industry, comprising an outer shell having a bottom wall and four walls extending upwardly from the bottom wall, an innter shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, said closure means including a slide gate valve, said slide gate valve having a frame mounted on the bottom wall of the outer shell and surrounding the discharge opening, a slide gate slidably mounted in the frame, said slide gate valve including a pull bar mounted on the slide gate, the pull bar having a handle having an opening extending through it, a thumb screw mounted on the outer shell next to the handle, said thumb screw having an opening extending through it, said openings in the handle and thumb screw being aligned with each other to permit a tamper evident wire to be put through the openings.

5. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, said closure means including a slide gate valve, said slide gate valve having a frame mounted on the bottom wall of the outer shell and surrounding the discharge opening, and a slide gate slidably mounted in the frame, said slide gate valve including a pull bar mounted on the slide gate, further including nut means adjustably mounted on the pull bar adapted to engage the outside of the outer shell for limiting how far the slide gate closes the discharge opening.

6. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, said closure means including a slide gate valve, said slide gate valve having a frame mounted on the bottom wall of the outer shell and surrounding the discharge opening, and a slide gate slidably mounted in the frame, said slide gate valve including a pull bar mounted on the slide gate, further including nut means adjustably mounted on the pull bar adapted to engage the outside of the outer shell for limiting how far the slide gate closes the discharge opening.

7. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, and mounting means for mounting a discharge chute over the discharge opening, said mounting means including a discharge chute retainer mounted on the bottom wall of the outer shell and surrounding the discharge opening, said discharge chute retainer having an annular flange for holding the peripheral end portions of a discharge chute.

8. The hopper of claim 7, further including a discharge chute held by the annular flange of the discharge chute retainer.

9. An integral double wall hopper for handling, storing and dispensing dry flowables such as capsules, tablets, and powders in the pharmaceutical industry, comprising an outer shell having a bottom wall and four opposed upright outer walls extending upwardly from the bottom wall, an inner shell having a frustoconical bottom wall and four inner walls extending upwardly from the frustoconical bottom wall, a lip rim along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the frustoconical bottom wall of the inner shell and in the bottom wall of the outer shell, and closure means positioned on the discharge opening for opening and closing the discharge opening to dispense the contents of the hopper when desired, means for blocking access to the closure means to protect the closure means form being struck and damaged by the tines of a forklift truck.

10. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, further including means for blocking access to the closure means to protect the closure means form being struck and damaged by the tines of a forklift truck, said blocking means including raised bosses formed in the bottom wall of the outer shell to protect the closure means from damage by the tines of a forklift.

11. An integral double wall hopper for handling, storing and dispensing dry flowables such as capsules, tablets, and powders in the pharmaceutical industry, comprising an outer shell having a bottom wall and four opposed upright outer walls extending upwardly from the bottom wall, an inner shell having a bottom wall and four inner walls extending upwardly from the bottom wall, a lip rim along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, and closure means positioned on the discharge opening for opening and closing the discharge opening to dispense the contents of the hopper when desired, further including a cover for covering the hopper, said cover including a flat portion, a downwardly extending skirt portion connected to the flat portion which forms a secure fit with the hopper when placed thereon, and a manway formed in the flat portion.

12. An integral double wall hopper for handling, storing and dispensing dry flowables such as capsules, tablets, and powders in the pharmaceutical industry, comprising an outer shell having a bottom wall and four opposed upright outer walls extending upwardly from the bottom wall, an inner shell having a bottom wall and four inner walls extending upwardly from the bottom wall, a lip rim along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the frustoconical bottom wall of the inner shell and in the bottom wall of the outer shell, and closure means positioned on the discharge opening for opening and closing the discharge opening to dispense the contents of the hopper when desired, further including a cover for covering the hopper, said cover including a flat portion, a downwardly extending skirt portion connected to the flat portion which forms a secure fit with the hopper when placed thereon, a manway formed in the flat portion, and a lid for covering the manway.

13. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, closure means positioned on the discharge opening for opening and closing the discharge opening to dispense the contents of the hopper when desired, a cover for covering the hopper, said cover including a flat portion, a downwardly extending skirt portion connected to the flat portion which forms a secure fit with the hopper when placed thereon, and a manway formed in the flat portion, further including a lid for covering the manway, further including a pair of towers formed in said flat portion and extending vertically upwardly from the flat portion for a distance at least as high as the vertical projection of the lid above the flat portion, said towers being positioned so that, when another hopper is stacked on the cover, the downwardly extending legs and runners of the upper hopper rest on the flat portion of the cover, and the towers about said leg and runners to prevent lateral movement of said upper stacked hopper on said cover.

14. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, closure means positioned on the discharge opening for opening and closing the discharge opening to dispense the contents of the hopper when desired, and a cover for covering the hopper, said cover including a pair of spacing towers formed in the cover at opposite ends of the cover, the combined width of each pair being sufficiently wide enough so that tines of the forklift must be spaced apart a distance such that the tines cannot accidentally damage the slide gate valve of the upper stacked hopper, said pairs of spacing towers being high enough to prevent the tines of a forklift from being inserted into the vertical space between said spacing towers and the upper stacked hopper.

15. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a bottom wall and four walls extending upwardly from the bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the bottom wall of the inner shell and in the bottom wall of the outer shell, closure means positioned on the discharge opening for opening and closing the discharge opening to dispense the contents of the hopper when desired, a cover for covering the hopper, and means for latching the cover to the lid of the hopper, said latching means including an adjustable draw latch apparatus mounted on the outer shell having a rod, said rod extending through a notch in the lip ledge of the hopper and a slot in the cover of the hopper.

16. An integral double wall hopper for handling, storing and dispensing dry flowables such as capsules, tablets, and powders in the pharmaceutical industry, comprising an outer shell having a bottom wall and four walls extending upwardly from the bottom wall, an inner shell having a frustoconical bottom wall and four walls extending upwardly from the frustoconical bottom wall, a lip along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the frustoconical bottom wall of the inner shell and in the bottom wall of the outer shell, and closure means positioned on the discharge opening for opening and closing the discharge opening to dispense the contents of the hopper when desired, said closure means including a slide gate valve, said slide gate valve having a frame mounted on the bottom wall of the outer shell and surrounding the discharge opening, and a slide gate slidably mounted in the frame, said hopper further including a pair of spaced-apart runners extending downwardly from opposed upright walls and forming spaces which allow entrance of the tines of a forklift truck to pick up the hopper, said runners having a protecting portion with a width substantially equal to or greater than the diameter of the discharge opening and the closure means and positioned in front of the discharge opening and the closure means for blocking and protecting the discharge opening and the closure means from the tines of a forklift truck as they pick up the hopper, said lip having an outer portion that is recessed inwardly to form a cover-engaging upright rim and ledge, a rib formed in the outer shell and abutting against the underside of the ledge of the lip, the ledge having an opening formed therein extending from the top of the ledge to the rib, and a card holder mounted on an upright wall of the outer shell for holding a card that identifies the contents of the hopper, said slide gate valve including a pull bar mounted on the slide gate, the pull bar having a handle having an opening extending through it, a thumb screw mounted on the outer shell next to the handle, said thumb screw having an opening extending through it, said openings in the handle and thumb screw being aligned with each other to permit a tamper evident wire to be put through the openings said hopper further including mounting means for mounting a discharge chute over the discharge opening, said mounting means including a discharge chute retainer mounted on the bottom wall of the outer shell and surrounding the discharge opening, said discharge chute retainer having an annular flange for holding the peripheral end portions of a discharge chute, a discharge chute held by the annular flange of the discharge chute retainer, and said hopper further including means for blocking access to the closure means to protect the closure means from being struck and damaged by the tines of a forklift truck, said blocking means including raised bosses formed in the bottom wall of the outer shell to protect the closure means from damage by the tines of a forklift, said hopper further including a cover for covering the hopper, said cover including a flat portion, a downwardly extending skirt portion connected to the flat portion which forms a secure fit with the hopper when placed thereon, a manway formed in the flat portion, a lid for covering the manway, a pair of towers formed in said flat portion and extending vertically upwardly from the flat portion for a distance at least as high as the vertical projection of the lid above the flat portion, said towers being positioned so that, when another hopper is stacked on the cover, the downwardly extending legs and runners of the upper hopper rest on the flat portion of the cover, and the towers abut said leg and runners to prevent lateral movement of said upper stacked hopper on said cover, a pair of spacing towers formed in the cover at opposite ends of the cover, the combined width of each pair being sufficiently wide enough so that tines of the forklift must be spaced apart a distance such that the tines cannot accidentally damage the slide gate valve of the upper stacked hopper, said pairs of spacing towers being high enough to prevent the tines of a forklift from being inserted into the vertical space between said spacing towers and the upper stacked hopper, and means for latching the cover to the lip of the hopper, said latching means including an adjustable draw latch apparatus mounted on the outer shell having a rod, said rod extending through a notch in the lip ledge of the hopper and a slot in the cover of the hopper, and said hopper further including transport means for transporting the hopper from place to place, said transport means including a dolly with a pair of wheels and a pair of casters.

17. An integral double wall hopper comprising an outer shell including a cylindrical upright wall and a bottom panel, an inner shell having a cylindrical upright wall with a frustoconical lower portion, a discharge opening molded in the center of the bottom wall of the frusto conical lower portion of the inner shell and in the bottom panel of the outer shell, closure means positioned on the discharge opening for opening and closing the discharge opening to dispense the contents of the hopper when desired, said outer shell bottom panel including four downwardly extending legs forming supporting members for the hopper, a main cover adapted to fit over and cover the top of the hopper, said cover including a downwardly extending lip portion which forms a secure fit with the hopper when placed thereon, said lip portion of the cover including a plurality of spaced apart ribs formed therein.

18. An integral double wall hopper comprising an outer shell including a cylindrical upright wall and a bottom panel, an inner shell having a cylindrical upright wall with a frustoconical lower portion, a discharge opening molded in the center of the bottom wall of the frusto conical lower portion of the inner shell and in the bottom panel of the outer shell, closure means positioned on the discharge opening for opening and closing the discharge opening to dispense the contents of the hopper when desired, said outer shell bottom panel including four downwardly extending legs forming supporting members for the hopper, a main cover adapted to fit over and cover the top of the hopper, said cover including a downwardly extending lip portion which forms a secure fit with the hopper when placed thereon, wherein the cover is hinged at one end to allow a portion of said cover to be raised to give access to the contents of the hopper without removing the entire cover.

19. An integral double wall hopper comprising
an outer shell including a cylindrical upright wall and a bottom panel,
an inner shell having a cylindrical upright wall with a frustoconical lower portion,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming supporting members for the hopper,
said outer shell bottom panel further including a pair of spaced apart runners spaced opposite one another along the outer shell upright wall between said downwardly extending legs for blocking and protecting the discharge opening and closure means from the tines of a forklift truck as they pick up the hopper,
a main cover adapted to fit over and cover the top of the hopper,
the cover including
a plurality of upwardly extending towers,
said towers being positioned to abut the legs and runners of a second hopper when the second hopper is stacked on the cover to prevent lateral movement of the second hopper on the cover.

20. An integral double wall hopper comprising
an outer shell including a cylindrical upright wall and a bottom panel,
an inner shell having a cylindrical upright wall with a frustoconical lower portion,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming supporting members for the hopper,
a main cover adapted to fit over and cover the top of the hopper,
the cover including
a manway formed therein, said manway to be adaptable to be covered with a lid,
a plurality of upwardly extending towers having a height that is at least equal to a vertical projection of the lid above the cover.

21. An integral double wall hopper comprising
an outer shell including a cylindrical upright wall and a bottom panel,
an inner shell having a cylindrical upright wall with a frustoconical lower portion,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming supporting members for the hopper,
said outer shell bottom panel further including a pair of spaced apart runners spaced opposite one another along the outer shell upright wall between said downwardly extending legs for blocking and protecting the discharge opening and closure means from the tines of a forklift truck as they pick up the hopper,
a main cover adapted to fit over and cover the top of the hopper,
the cover including
a manway formed therein, said manway to be adaptable to be covered with a lid,
a plurality of upwardly extending towers having a height that is at least equal to a vertical projection of the lid above the cover,
said towers being positioned to abut the legs and runners of a second hopper when the second hopper is stacked on the cover to prevent lateral movement of the second hopper on the cover.

22. An integral double wall hopper comprising
an outer shell including a cylindrical upright wall and a bottom panel,
an inner shell having a cylindrical upright wall with a frustoconical lower portion,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming supporting members for the hopper,
a main cover adapted to fit over and cover the top of the hopper,
the cover including
a pair of spacing towers formed at opposite ends of the cover nearest the front and rear walls of the outer shell,
said spacing towers being wide enough so that tines of a forklift must be spaced apart for a distance such that they cannot damage the closure means of a second hopper stacked on the cover.

23. An integral double wall hopper comprising
an outer shell including a cylindrical upright wall and a bottom panel,
an inner shell having a cylindrical upright wall with a frustoconical lower portion,
a discharge opening molded in the center of the bottom of the frusto conical lower portion of the inner shell and in the bottom panel of the outer shell,
closure means positioned on the discharge opening for opening and closing the discharge opening to dispense the contents of the hopper when desired,
said outer shell bottom panel including four downwardly extending legs forming supporting members for the hopper,
a main cover adapted to fit over and cover the top of the hopper,
the cover including
a pair of spacing towers formed at opposite ends of the cover nearest the front and rear walls of the outer shell,
said spacing towers being wide enough so that tines of a forklift must be spaced apart for a distance such that they cannot damage the closure means of a second hopper stacked on the cover, said spacing towers being high enough to prevent the tines of a forklift from being inserted into the vertical space between said spacing towers and the bottom of the front and rear walls of the outer shell of a second hopper when the second hopper is stacked on the cover.

24. An integral double wall hopper for handling, storing and dispensing dry flowables such as capsules, tablets, and powders in the pharmaceutical industry, comprising an outer shell having a bottom wall and four opposed upright outer walls extending upwardly from the bottom wall, an inner shell having a bottom wall and four inner walls extending upwardly from the bottom wall, a lip rim along the upper edges of the upwardly extending walls connecting the outer shell to the inner shell, said outer and inner shells being integrally molded together to form the double wall hopper, four downwardly extending legs formed in the bottom wall of the outer shell forming supporting members for the hopper, a discharge opening molded in the center of the frustoconical bottom wall of the inner shell and in the bottom wall of the outer shell, and closure means positioned on the discharge opening for opening and closing the discharge opening to dispense the contents of the hopper when desired, further including a cover for covering the hopper, said cover including a flat portion, a downwardly extending skirt portion connected to the flat portion which forms a secure fit with the hopper when placed thereon, and said closure means including a slide gate valve, said slide gate valve having a frame mounted on the bottom wall of the outer shell and surrounding the discharge opening, and a slide gate slidably mounted in the frame, and the cover including access means for providing access to the contents of the hopper without removing the entire cover.

* * * * *